United States Patent
Davidson, Jr. et al.

(10) Patent No.: US 10,334,210 B2
(45) Date of Patent: *Jun. 25, 2019

(54) AUGMENTED VIDEO SYSTEM PROVIDING ENHANCED SITUATIONAL AWARENESS

(71) Applicant: Insitu, Inc., Bingen, WA (US)

(72) Inventors: Darcy Davidson, Jr., Dallesport, WA (US); Theodore T. Trowbridge, Hood River, OR (US)

(73) Assignee: Insitu, Inc., Bingen, WA (US)

( * ) Notice: Subject to any disclaimer, the term of this patent is extended or adjusted under 35 U.S.C. 154(b) by 216 days.

This patent is subject to a terminal disclaimer.

(21) Appl. No.: 15/162,463

(22) Filed: May 23, 2016

(65) Prior Publication Data

US 2016/0344980 A1 Nov. 24, 2016

Related U.S. Application Data

(63) Continuation of application No. 13/754,795, filed on Jan. 30, 2013, now Pat. No. 9,380,275.

(51) Int. Cl.
*H04N 7/18* (2006.01)
*G06T 11/60* (2006.01)
(Continued)

(52) U.S. Cl.
CPC ............ *H04N 7/183* (2013.01); *G01C 11/00* (2013.01); *G01C 11/02* (2013.01); *G05D 1/0038* (2013.01);
(Continued)

(58) Field of Classification Search
CPC ......... H04N 7/183; G06T 11/60; G06T 17/05; G06T 19/006; G06T 11/00; G01C 11/00;
(Continued)

(56) References Cited

U.S. PATENT DOCUMENTS 5,267,329 A 11/1993 Ulich et al.
6,079,665 A 6/2000 Nella et al.
(Continued)

FOREIGN PATENT DOCUMENTS

CN 101978394 2/2011
EP 1168830 A1 1/2002
(Continued)

OTHER PUBLICATIONS

Abrams et al., "Participatory Integration of Live Webcams into GIS," Deparment of Computer Science and Engineering, Washington University in St. Louis, 2010, 8 pages.
(Continued)

*Primary Examiner* — Yon J Couso
(74) *Attorney, Agent, or Firm* — Perkins Coie LLP

(57) ABSTRACT

A facility, comprising systems and methods, for providing enhanced situational awareness to captured image data is disclosed. The disclosed techniques are used in conjunction with image data, such as a real-time or near real-time image stream captured by a camera attached to an unmanned system, previously captured image data, rendered image data, etc. The facility enhances situational awareness by projecting overlays onto captured video data or "wrapping" captured image data with previously-captured and/or "synthetic world" information, such as satellite images, computer-generated images, wire models, textured surfaces, and so on. The facility also provides enhanced zoom techniques that allow a user to quickly zoom in on an object or area of interest using a combined optical and digital zoom technique. Additionally, the facility provides a digital lead indicator designed to reduce operator-induced oscillations in commanding an image capturing device.

20 Claims, 28 Drawing Sheets

(51) Int. Cl.
| | |
|---|---|
| *G06T 17/05* | (2011.01) |
| *G06T 19/00* | (2011.01) |
| *G05D 1/00* | (2006.01) |
| *G01C 11/00* | (2006.01) |
| *G06T 11/00* | (2006.01) |
| *G01C 11/02* | (2006.01) |
| *G01C 11/36* | (2006.01) |

(52) U.S. Cl.
CPC .............. *G06T 11/00* (2013.01); *G06T 11/60* (2013.01); *G06T 17/05* (2013.01); *G06T 19/006* (2013.01); *G01C 2011/36* (2013.01)

(58) Field of Classification Search
CPC ... G01C 2011/36; G01C 11/02; G05D 1/0038
See application file for complete search history.

(56) References Cited

U.S. PATENT DOCUMENTS

| | | |
|---|---|---|
| 6,408,429 B1 | 6/2002 | Marrion, Jr. et al. |
| 6,889,113 B2 | 5/2005 | Tasker et al. |
| 7,095,878 B1 | 8/2006 | Taylor et al. |
| 7,426,317 B2 | 9/2008 | Nielsen |
| 7,620,204 B2 | 11/2009 | Porikli et al. |
| 7,636,452 B2 | 12/2009 | Kamon |
| 7,929,730 B2 | 4/2011 | Huang et al. |
| 7,970,532 B2 | 6/2011 | Tehan et al. |
| 8,139,863 B1 | 3/2012 | Hsu |
| 8,620,093 B2 | 12/2013 | Nguyen et al. |
| 8,810,648 B2 | 8/2014 | Bibby et al. |
| 8,810,650 B1 | 8/2014 | Neumann |
| 9,373,051 B2 | 6/2016 | Viviani |
| 9,380,275 B2 | 6/2016 | Davidson, Jr. et al. |
| 2004/0170330 A1 | 9/2004 | Fogg |
| 2004/0189830 A1 | 9/2004 | Pollard |
| 2006/0285723 A1 | 12/2006 | Morellas et al. |
| 2007/0080851 A1 | 4/2007 | Shapira |
| 2008/0060034 A1 | 3/2008 | Egnal et al. |
| 2010/0288910 A1 | 11/2010 | Robinson et al. |
| 2011/0007962 A1 | 1/2011 | Johnson et al. |
| 2011/0145256 A1 | 6/2011 | Dunkel et al. |
| 2011/0298650 A1 | 12/2011 | Yapa et al. |
| 2012/0019522 A1 | 1/2012 | Lawrence et al. |
| 2012/0045134 A1 | 2/2012 | Perronnin et al. |
| 2012/0189207 A1 | 7/2012 | Doretto et al. |
| 2012/0200703 A1 | 8/2012 | Nadir et al. |
| 2012/0307042 A1 | 12/2012 | Lee et al. |
| 2013/0077887 A1 | 3/2013 | Elton et al. |
| 2013/0232419 A1 | 9/2013 | Yates et al. |

FOREIGN PATENT DOCUMENTS

| | | |
|---|---|---|
| WO | WO-9713357 A1 | 4/1997 |
| WO | WO-2008153597 A1 | 12/2008 |

OTHER PUBLICATIONS

Bartelsen et al., "Orientation of Image Sequences Acquired from UAVS and with GPS Cameras," Institute of Applied Computer Science, Bundeswehr University of Munich, Neubiberg, Germany, Sep. 1, 2010, 6 pages.

Berberan-Santos et al., "Expressing a Probability Density Function in Terms of Another PDF: A Generalized Gram-Charlier Expansion," Journal of Mathematical Chemistry, vol. 42, No. 3, Oct. 2007, 10 pages.

Bowers et al., "Expansion of Probability Density Functions as a Sum of Gamma Densities with Application in Risk Theory," Transactions of Society of Actuaries, vol. 18, Part 1, No. 52, 1996, 23 pages.

Calhoun et al., "Synthetic vision system of improving unmanned aerial vehicle operator situation awareness," Proc. SPIE vol. 5802, Enhanced and Synthetic Vision, 2005, 13 pages.

Campion et al., "Direct Geo-Referencing Technique for Rapid Positioning of Targets and Environmental Products Using Tactical Grade Airborne Imaging Data," Oceans 2002 Conference and Exhibition Conference Proceedings, 2002, 6 pages.

Comaniciu et al., "Kernel-Based Object Tracking," IEEE Transactions on Pattern Analysis and Machine Intelligence, vol. 25, May 2003, 14 pages.

Cooper et al., "Towards Combining UAV and Sensor Operator Roles in UAV-Enabled Visual Search," HRI'08, Amsterdam, The Netherlands, Mar. 12-15, 2008, 8 pages.

Inanc et al., "Nonlinear Trajectory Generation for Unmanned Air Vehicles with Multiple Radars," 43rd IEEE Conference on Decision and Control, Dec. 14-17, 2004, 6 pages.

International Preliminary Report on Patentability for International Patent Application No. PCT/US2014/013497, Applicant: Insitu, Inc., dated Aug. 13, 2015, 22 pages.

International Search Report and Written Opinion for International Patent Application No. PCT/US2014/013497, Applicant: Insitu, Inc., dated Jul. 28, 2015, 30 pages.

Invitation to Pay Additional Fees and Communication to the Results of the Partial International Search for International Patent Application No. PCT/US2014/013497, Applicant: Insitu, Inc., dated Nov. 28, 2014, 9 pages.

Kim et al., "Augmenting Aerial Earth Maps with Dynamic Information from Videos," Virtual Reality, 2011, 16 pages.

Nebiker, Stephen, "Combining micro UAV based mobile video imagery and virtual globes—a test case for future sensor web capabilities," EuroSDR & ISPRS Workshop on Geosensor Networks, Hannover, Feb. 20-22, 2008, 34 pages.

Nelson et al., "Zoom Techniques for Achieving Scale Invariant Object Tracking in Real-Time Active Vision Systems," Rochester Institute of Technology, Proc of SPIE, vol. 6569, 2007, 12 pages.

Owens et al., "Using Immersive 3D Terrain Models for Fusion of UAV Surveillance Imagery," American Institute of Aeronautics and Astronautics, Jul. 2009, 10 pages.

Ren et al., "Automatic Spectral Target Recognition in Hyperspectral Imagery," IEEE Transaction on Aerospace and Electronic Systems, vol. 39, No. 4, Oct. 2003, 18 pages.

Sawhney et al., "Video Flashlights—Real Time Rendering of Multiple Videos for Immersive Model Visualization," Thirteenth Eurographics Workshop for Rendering, 2002, 12 pages.

Sward et al., A Situational Awareness Tool for Unmanned Aerial Vehicles (UAVs), Institute for Information Technology Applications, United States Air Force Academy, Colorado, Aug. 2005, 9 pages.

Wixon et al., "Image Alignment for Precise Camera Fixation and Aim," IEEE Computer Society Conference on Santa Barbara, CA, 1998, 8 pages.

Wu et al., "Vison-based Auxiliary Navigation Method using Augmented Reality for Unmanned Aerial Vehicles," Industrial Informatics (INDIN), 10th IEEE International Conference, 2012, 6 pages.

Chinese Search Report for CN2014800067086, Applicant: Insitu, Inc., dated Feb. 24, 2017, 4 pages.

AUGMENTED VIDEO SYSTEM PROVIDING ENHANCED SITUATIONAL AWARENESS

BACKGROUND

Unmanned systems (e.g., unmanned aerial or aircraft systems, unmanned ground systems, and unmanned underwater systems) provide a low-cost and low-risk alternative to a variety of reconnaissance-type tasks performed by manned systems. Unmanned aircraft systems, for example, are used by TV news stations, by the film/television industry, the oil industry, for maritime traffic monitoring, border/shore patrol, civil disaster surveillance, drug enforcement activities, spotting and monitoring fleets of fish (e.g., tuna), etc. Law enforcement agencies use manned helicopters and airplanes as an integral part of their operations, but unmanned aircraft systems are being used in a growing number of situations. The uses for aviation equipment in law enforcement that can be filled by unmanned aerial systems include, for example:

Photographic uses,
Surveillance uses,
Routine patrol/support,
Fugitive searches,
Search and Rescue,
Pilot Training,
Drug Location/Interdiction,
SWAT operations, and
Firefighting/Support.

Unmanned systems can include a Global Positioning System (GPS) receiver to obtain adequate near real time position data to indicate where the system is, and calculate attitude with feedback information from solid-state rate gyros. Unmanned aerial systems capable of, for example, automated take-off/launch, flight via programmed waypoints, and snag-type recovery have been developed so as to reduce the acquisition and operation costs when compared to manned aircraft (e.g., single-pilot fixed and rotor aircraft).

Typical unmanned systems may be remotely operated by a user or controller at a fixed or mobile remote control station. From the ground control station, the controller can observe the behavior of the unmanned system, control the unmanned system, receive feedback and information from the unmanned system, such as information gathered by various sensors installed on the unmanned system (e.g., information about the state (e.g., position, orientation, velocity) of the unmanned system, information about the surrounding area, information about other vehicles/systems in the surrounding area), and so on. Typical unmanned systems, however, do not provide and/or display information that allows users or controllers to, for example, identify and locate targets, identify and locate restricted operating zones, or view captured information in the context of a surrounding environment, such as geographical information.

DETAILED DESCRIPTION

Figure 1:
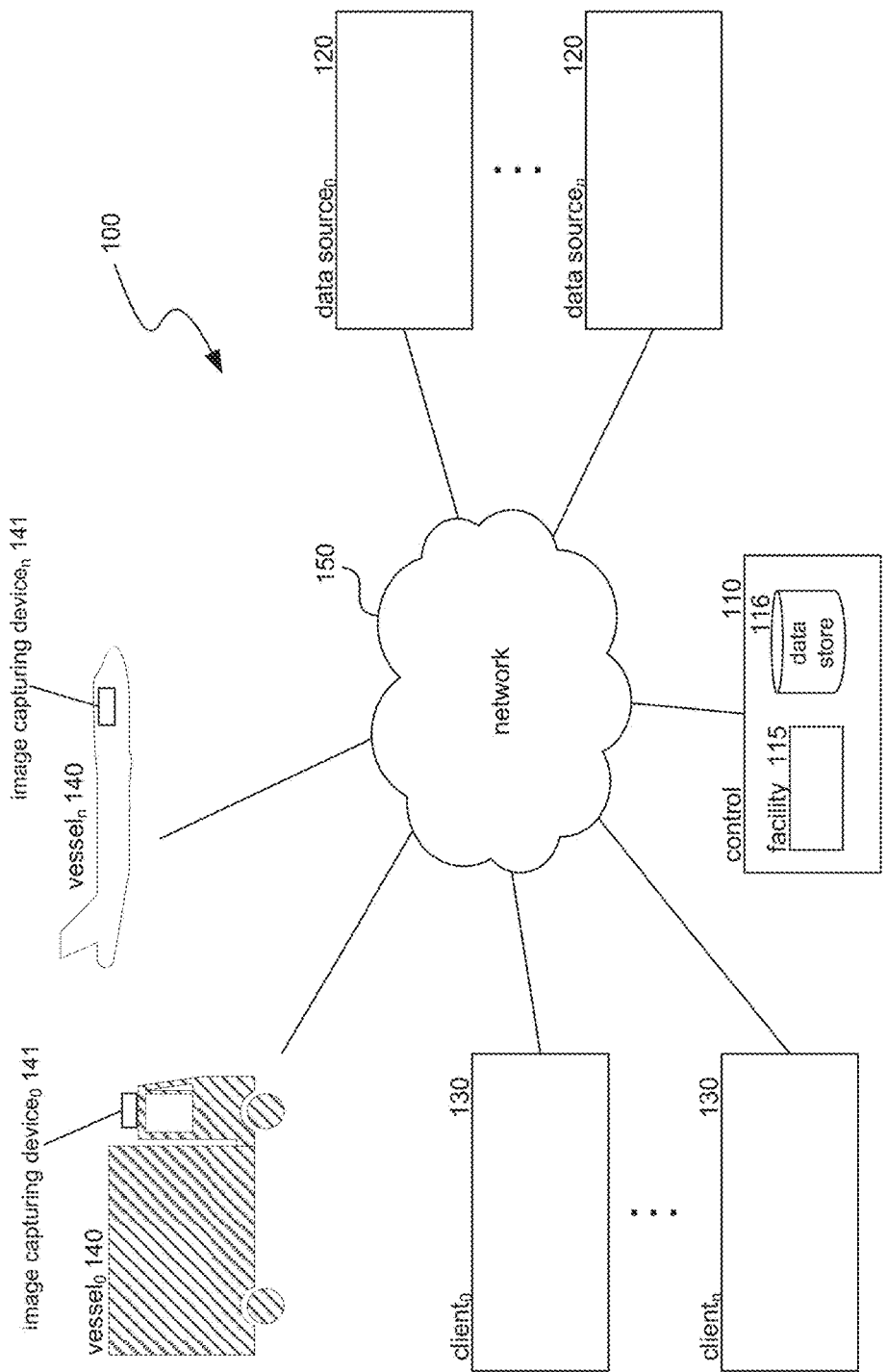
FIG. 1 is a block diagram illustrating an environment in which a facility in accordance with an embodiment of the present technology may operate.

A facility, comprising systems and methods, for providing enhanced situational awareness to captured image data and increasing actionable intelligence is disclosed. The disclosed techniques are used in conjunction with image data, such as a real-time or near real-time image stream captured by an image capturing device (e.g., color or black and white camera, infrared sensor, or ultraviolet sensor) carried by an unmanned system, and/or previously captured image data, and/or rendered image data, and so on. The image data may include analog or digital video streams, such as STANAG 4609-compliant video streams. In some embodiments, the disclosed systems and methods provide techniques for overlaying reference information and symbols onto or in conjunction with captured video data, wrapping real-time or near real-time video data with synthetic world information (e.g., previously captured image data or generated models of surrounding information), and providing a virtual camera configured to navigate the wrapped live video data. In this manner, the disclosed techniques can augment the display of captured video data to provide additional context and a greater level of situational awareness of areas (and surrounding areas) monitored by unmanned systems. By augmenting the video that users and operators see with geographical and other information, the facility improves the ability to obtain situational awareness of a particular area.

In some embodiments, the facility enhances situational awareness by projecting overlays onto captured video data. For example, one or more overlays may be displayed over and simultaneously with the display of a video feed, such as a live video feed or a recorded video feed. Individual overlays can include symbols and/or text to help identify and monitor objects with the video feed. The overlays may include, for example, target overlays, map annotation overlays, street overlays, border overlays, boundary overlays (e.g., restricted operating zones, airspace classes), detectability overlays, heading and groundspeed overlays, unsafe elevation overlays, reticle overlays, aircraft route overlays, military grid reference system overlays, and so on. For example, target overlays may alert the user or operator of various objects or targets of interest (e.g., a building, a school of fish, a vehicle, a runway, and other unmanned systems) within the captured image data. In this manner, the facility can highlight and alert the user or operator to objects of interest and related information.

In some embodiments, the facility "wraps" captured image data, such as images from a real-time camera stream, with previously-captured and/or "synthetic world" information, such as satellite images, computer-generated images, wire models, textured surfaces, and so on. In this manner, captured image data can be viewed in the context of surrounding information, such as satellite imagery, terrain information, structures, bathymetric information, and so on. For example, the facility can augment the display of a live camera feed to include previously-captured satellite imagery of the area around the area captured within the live camera feed. Thus, a user can view the live camera feed in the context of the area surrounding the area within the view of the camera to enhance a viewer's situational awareness. Moreover, multiple camera feeds can be included so that a user or operator can view multiple "live" areas wrapped with synthetic or other information. In this manner, a user's view is not limited to the images captured by a single camera but, rather, can include information about the surrounding area.

In some embodiments, the facility provides enhanced zoom techniques that allow a user to quickly zoom in on an object or area of interest using a combined optical and digital zoom technique. In some instances, an image capturing device may have a zoom rate that prevents a user from optically zooming in on or out from an object or area of interest at a desired rate. In other words, the user may not be able to optically zoom in on an object as fast as the user would like due to limitations of the camera. The facility overcomes this problem by, in response to a request from a user to perform a zoom-in operation, determining whether the camera is capable of performing the desired zoom within a predetermined period (e.g., 1 millisecond, 1 second, 10 seconds, and so on). If the camera cannot perform the desired zoom within the predetermined period, the system digitally zooms in on the desired object or area and, while the camera is optically zooming, periodically (e.g., every millisecond, 5 milliseconds, 1 second, and so on) updates the display using the newly captured (and optically-zoomed) image data. In this manner, the user is quickly presented with digitally-zoomed data at a desired zoom level or magnification factor while the camera zooms. Furthermore, the digitally-zoomed in data is regularly updated while the camera optically zooms in to provide images with increasing resolution while the camera zooms in.

In some embodiments, the system provides a digital lead indicator. The digital lead indicator is designed to reduce operator-induced oscillations in commanding an image capturing device. Typically, when an operator is controlling an image capturing device to track a moving object using, for example, a joystick, the operator may induce oscillations into the motion of the image capturing device as the image capturing device swings past the moving object and the operator repeatedly corrects the orientation of the image capturing device. The digital lead indicator is designed to avoid these operator-induced oscillations by displaying a "digital lead indicator" in the form of a dot or other shape at a point where the image capturing device is predicted to be pointing in a specified period of time (e.g., 0.5 seconds, 1.0 seconds, 10 milliseconds).

In some embodiments, the facility may be commanded to automatically track an object by repeatedly performing object recognition techniques, such as those disclosed in U.S. Provisional Patent Application No. 61/659,935, entitled STATISTICAL APPROACH TO IDENTIFYING AND TRACKING TARGETS WITHIN CAPTURED IMAGE DATA, filed Jun. 14, 2012, which is herein incorporated by reference in its entirety. The facility can then automatically command an image capturing device to keep the object at or near the center (or other location) of a video display. This tracking mode allows a user to maintain focus on a particular object or area.

FIG. 1 is a block diagram illustrating an environment 100 in which the facility 115 may operate in accordance with certain embodiments. The environment comprises control computing device 110, data sources 120, client computing devices 130, vessels 140, image capturing devices 141, and network 150. The control computing device 110 comprises a facility 115 and a data store 116. The facility 115 comprises systems and methods for enhancing situational awareness of captured image data.

Figure 2:
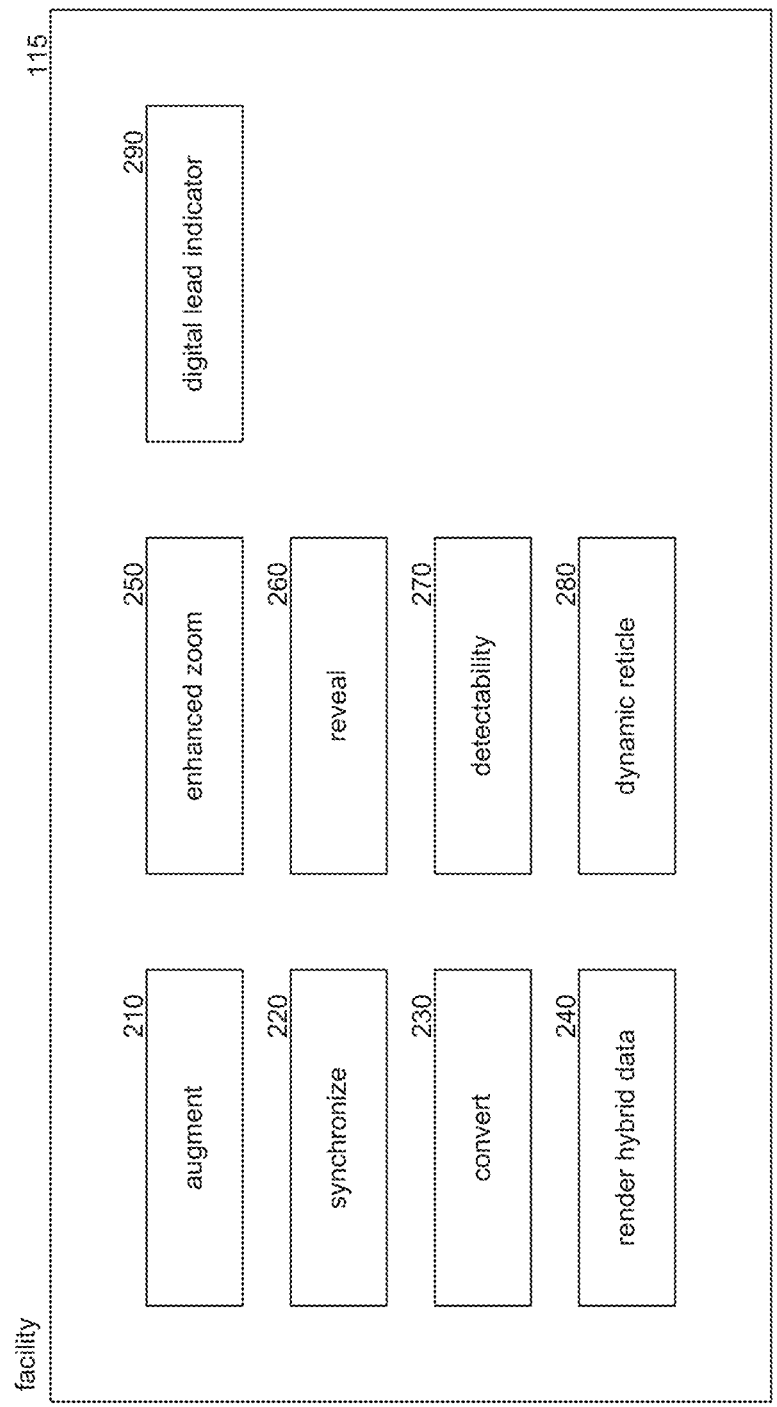
FIG. 2 is a block diagram illustrating a facility in accordance with an embodiment of the present technology.

FIG. 2 is a block diagram illustrating a facility in accordance with certain embodiments. The facility 115 is comprised of one or more of the following components: an augment component 210, a synchronize component 220, a convert component 230, a render hybrid data component 240, an enhanced zoom component 250, a reveal component 260, a detectability component 270, a dynamic reticle component 280, and a digital lead indicator component 290. The augment component 210 is invoked by the facility 115 to augment captured image data with overlay information, such as target overlays, terrain overlays, structural overlays, and/or other suitable overlays. The synchronize component 220 is invoked by the facility 115 to synchronize captured image data, such as video data frames, with metadata specifying position, orientation, and configuration information of the image capturing device used to capture the image data and further specifying a timestamp. The convert component 230 is invoked by the facility 115 to convert the position of overlay symbols and information into screen coordinates based on, for example, the distance of corresponding objects in real space from the image capturing device and the current configuration of the image capturing device. The Render hybrid data component 240 is invoked by the facility 115 to augment captured image data with information relating to a surrounding area. The enhanced zoom component 250 is invoked by the facility 115 to perform an enhanced zoom that combines optical and digital zoom techniques. The reveal component 260 is invoked by the facility 115 to reveal or highlight objects of interest to the user. The detectability component 270 is invoked by the facility 115 to calculate the detectability or observability of a vehicle, such as an unmanned aircraft vehicle, and to augment a display to include an indication of the calculated detectability. The dynamic reticle component 280 is invoked by the facility 115 to display a reticle having dynamic subtends that shift to maintain a fixed distance within captured image data. The digital lead indicator component 290 is invoked by the facility 115 to estimate a location where an image capturing device will be pointing after a predetermined period of time. The data store 116 stores information collected from various sources, such as data sources 120, client computing devices 130, vessels 140, or other sources. The data sources 120 provide information used by the facility 115 to enhance captured image data, such as geographical information, topographical information, map information, overlays, and so on. The client computing devices 130 provide access to the facility 115 to remote users. The vessels 140 provide captured image data from an image capturing device carried by the respective vessel. The vessels may be, for example, automobiles, airplanes, helicopters, unmanned aircraft vehicles, people, animals, and/or other suitable vehicles. Furthermore, in this example control computing device 110, data sources 120, client computing devices 130, and vessels 140 are connected via network 150.

Figure 3:
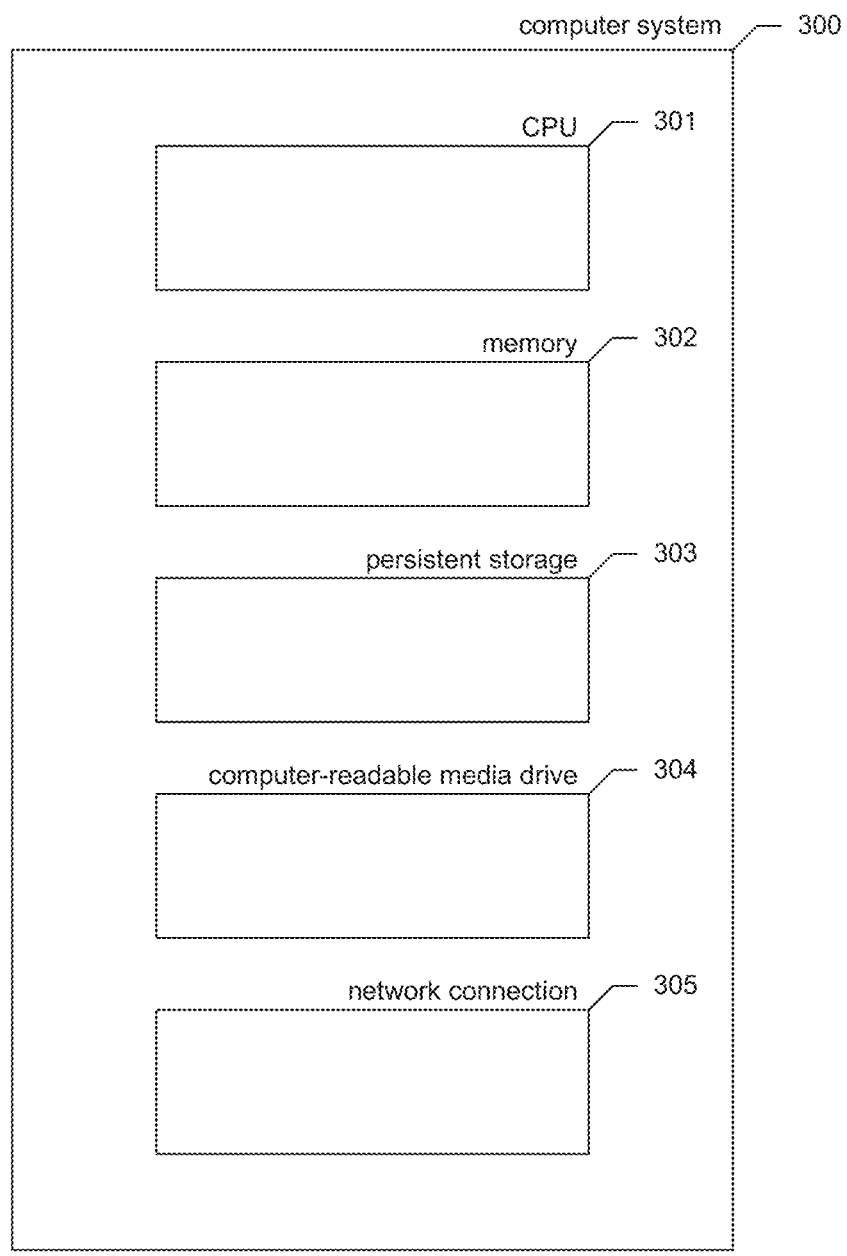
FIG. 3 is a block diagram illustrating some of the components incorporated in associated computing systems in accordance with an embodiment of the present technology.

FIG. 3 is a block diagram illustrating some of the components incorporated in associated computing systems in accordance with certain embodiments. The computer system 300 comprises one or more central processing units ("CPUs") 301 for executing computer programs; a computer memory 302 for storing programs and data while they are being used; a persistent storage device 303, such as a hard drive for persistently storing programs and data; a computer-readable media drive 304, such as a CD-ROM drive, for reading programs and data stored on a computer-readable medium; and a network connection 305 for connecting the computer system to other computer systems, such as via the Internet. While computer systems configured as described above are suitable to support the operation of the disclosed technology, those skilled in the art will appreciate that the techniques may be implemented using other suitable devices of various types and configurations. Moreover, communications to and from the CPU and on data buses and lines can be encrypted to protect against snooping of internal data.

The computing devices on which the disclosed techniques may be implemented can include a central processing unit, memory, input devices (e.g., keyboard and pointing devices), output devices (e.g., display devices), and storage devices (e.g., disk drives). The memory and storage devices are computer-readable storage media that may be encoded with computer-executable instructions that implement the technology, which means a computer-readable storage medium that stores the instructions. In addition, the instructions, data structures, and message structures may be transmitted via a computer-readable transmission medium, such as a signal on a communications link. Thus, "computer-readable media" includes both computer-readable storage media for storing information and computer-readable transmission media for transmitting information. Additionally, data used by the facility may be encrypted. Various communications links may be used, such as the Internet, a local area network, a wide area network, a point-to-point dial-up connection, a cell phone network, wireless networks, and so on.

The disclosed technology may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments, including cloud-based implementations.

Many embodiments of the technology described herein may take the form of computer-executable instructions, including routines executed by a programmable computer. Those skilled in the relevant art will appreciate that aspects of the technology can be practiced via computer systems other than those shown and described herein. Embodiments of the technology may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display, LCD, LED display, OLED display, and so on.

The technology can also be practiced in distributed environments, where tasks or modules are performed by remote processing devices linked through a communications network. In a distributed computing environment, program modules or subroutines may be located in local and remote memory storage devices. Aspects of the technology described herein may be stored or distributed on computer-readable media, including magnetic or optically readable or removable computer disks. Furthermore, aspects of the technology may be distributed electronically over networks. Data structures and transmissions of data particular to aspects of the technology are also encompassed within the scope of the technology.

Figure 4:
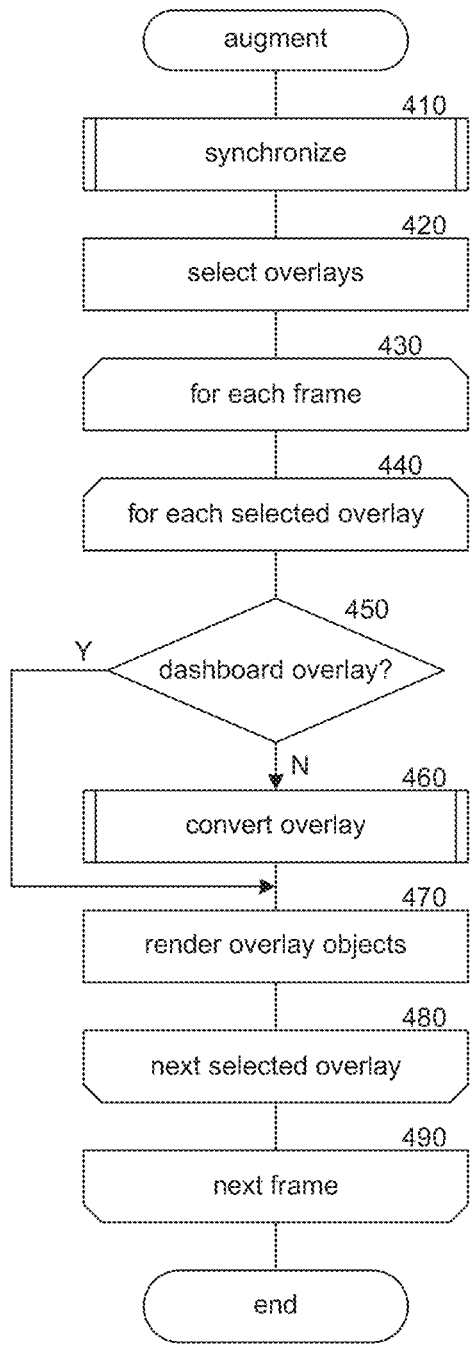
FIG. 4 is a flow diagram illustrating processing of the augment component in accordance with an embodiment of the present technology.

FIG. 4 is a flow diagram illustrating a processing method performed by an augment component in accordance with certain embodiments. The augment component is invoked to enhance captured image data with overlay information. In block 410, the component invokes a synchronize component to synchronize or align captured image data with metadata specifying position, orientation, and configuration information of the image capturing device used to capture the image data and a timestamp. In block 420, the component selects overlays to display. The overlays may include, for example, object of interest overlays, map annotation overlays, flight path overlays, waypoint and route overlays, engine out boundaries overlays, terrain contour overlays, map overlays, building overlays, city block overlays, 3D airspace overlays (e.g., Classes A-E airspace), detectability overlays, automatic identification system (AIS) overlays, approach information overlays, and for other suitable overlays. Individual overlays can be comprised of one or more files that specify, for example, position, dimension, and label information for corresponding objects. For example, a building overlay may include position and dimension (width, length, height, etc.) information for various buildings within a geographical area along with a label for each building. As another example, a map annotation overlay may include position, orientation, and dimension information for various objects, such as streets, political boundaries, no-fly zones, restricted operating zones, and an associated label. Thus, using map annotation overlays, the facility can display descriptive text for objects within captured image data. As another example, a terrain contour overlay includes topographical information (terrain elevation at various locations) for a geographical area. As another example, a map overlay may include or identify images of a map and their corresponding locations so that the images can displayed over, or in addition to, captured image data and other data, such as terrain information. As another example, an AIS overlay may include information corresponding to the position and dimensions of vessels operating within a specified area. In some cases, an AIS overlay may include a list of operating vessels to locate with an AIS receiver. This location information can then be added to an overlay for display in conjunction with a video frame.

The facility may maintain or receive overlay files for any of a number of geographical areas. Moreover, overlay files for different geographical areas and even different types of overlays may be combined into a single overlay file. Overlay files may be created by processing user interactions with video frames to receive and store position, dimension, and label information for various objects represented in an overlay file. For example, in response to receiving a request from a user to create or update overlay information for an object, the facility may prompt the user to provide information for the object by, for example, drawing a box around the object, tracing the shape of the object, and providing a label for the object. Alternatively, location, dimension, and label information may be received from other sources, such as the SKETCHUP (www.sketchup.com) provided by TRIMBLE of Mountain View, Calif. or the TRIMBLE 3D WAREHOUSE (sketchup.google.com/3dwarehouse) powered by GOOGLE of Sunnyvale, Calif. In some cases, overlay information may be dynamically updated. For example, position and dimension information for a moving object of interest, such as a moving vehicle, may be transmitted to the facility periodically as the object of interest moves. The position and dimension information may be provided by the object of interest and/or another data source, such as another vehicle or person tracking the object or by the facility itself while in tracking mode or using shape recognition techniques. Thus, the facility can take advantage of dynamically collected information and automatically adjust overlays in real-time. Similarly, while the facility is in tracking mode, the component can estimate the speed and direction of moving objects based on where the moving object is recognized from video frame to video frame and the distance between the image capturing device and the moving object. The distance between the image capturing device and the moving object can be calculated based on position information for the moving object and the image capturing device and/or information collected from a rangefinder.

In blocks 430-490, the component loops through, for each frame, each of the selected overlays, converts information associated with the overlay into screen coordinates, and then displays the converted information with the selected frame (e.g., over the selected frame or blended with the selected frame). In block 430, the component selects a video frame. In block 440, the component selects one of the selected overlays. In decision block 450, if the selected overlay is a dashboard overlay then the component continues at block 470, else the component continues at block 460. A dashboard overlay is an overlay that is not affected by the perspective of the captured image data, such as an overlay that displays current coordinates of the image capturing device or an associated vehicle, an overlay that displays mileage or fuel information for a vehicle to which the image capturing device is affixed, and so on. A non-dashboard overlay is one that is affected by the perspective of the captured image data because it transforms overlay objects in an attempt to align the overlay objects with actual objects. In block 460, the component invokes a convert component to convert the position of overlay objects into screen coordinates. In block 470, the component displays the overlay by rendering the overlay objects at corresponding screen coordinates using various rendering techniques and libraries, such as OpenGL® provided by Silicon Graphics International Corp. of Fremont, Calif., DirectX® provided by Microsoft of Redmond, Wash. The rendered objects may represent the shape of the corresponding object or simply highlight the object by, for example, rendering a circle, perforated square, and/or other shape at the corresponding screen coordinates. For example, the component may render the overlay objects over the captured image data or may blend the overlay objects with the captured image data using alpha compositing techniques. Furthermore, the facility may assign different colors to different overlays and/or different overlay objects to better distinguish between overlay objects associated with different overlays. For example, object of interest overlay objects may be rendered in red while building overlay objects are rendered in blue. Additionally, overlay objects associated with the same overlay may be displayed in different colors. In block 480, the component loops back to block 440 for processing of the next selected overlay, if any. In block 490, the component loops back to block 430 for processing of the next frame, if any.

Figure 5:
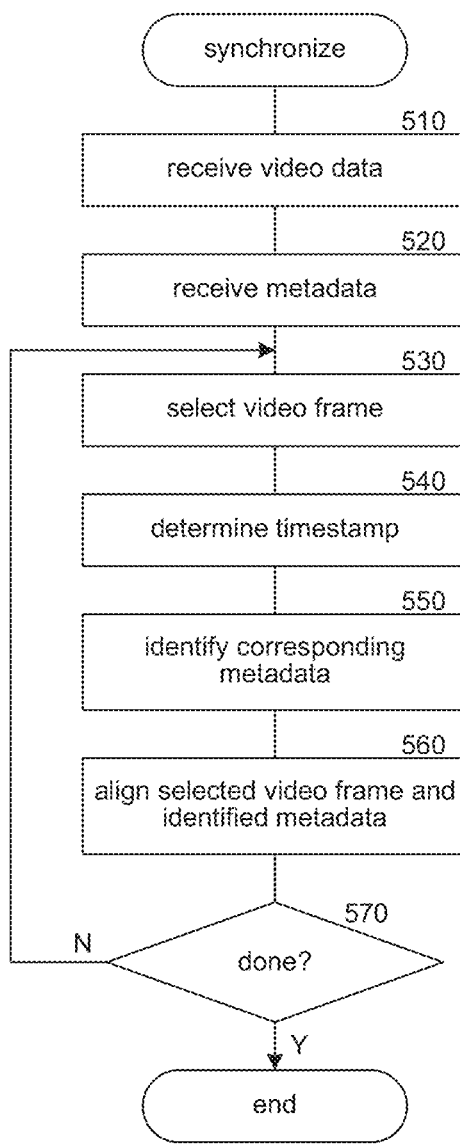
FIG. 5 is a flow diagram illustrating processing of a synchronize component in accordance with an embodiment of the present technology.

FIG. 5 is a flow diagram illustrating a processing method performed by a synchronize component in accordance with certain embodiments. In block 510, the component receives video data and associated timing information, such as a timestamp for each video frame or some subset of the video frames. For example, the component may receive video data from an image capturing device or another system, such as an unmanned aircraft vehicle system where each frame, or every third frame, or every fiftieth frame, etc. has an associated timestamp. In block 520, the component receives metadata specifying position information (e.g., longitude, latitude, and altitude of the image capturing device or a vehicle to which the image capturing device is affixed), orientation information (e.g., tilt and pan angle of the image capturing device relative to a vehicle to which the image capturing device is affixed or a look vector), and configuration information of the image capturing device (e.g., focal length, digital zoom settings, the field of view of the image capturing device, and so on), and a timestamp. In block 530, the component selects a video frame from among the received video data. In block 540, the component determines the timestamp associated with the selected video frame. The timestamp corresponds to the time at which the selected video frame was captured and may be generated by the image capturing device when capturing or storing the video frame or may be added by a separate system that processes the captured image data. In block 550, the component identifies received metadata corresponding to the selected video frame based on the determined timestamp and the timestamp associated with the identified metadata. That is, the component identifies the position, orientation, and configuration information of the image capturing device closest in time to the time at which the video frame was captured. In block 560, the component aligns the selected video frame to the identified metadata by storing an association or mapping between the selected video frame and the identified metadata. In decision block 570, if there are additional video frames to process, then the component loops back to block 530 to select the next video frame, else processing of the component completes. For example, the component may be invoked to perform batch processing of previously-captured image data and thus multiple video frames can be aligned to metadata or may be invoked to process individual video frames in real-time as the individual video frames are captured.

Figure 6A:
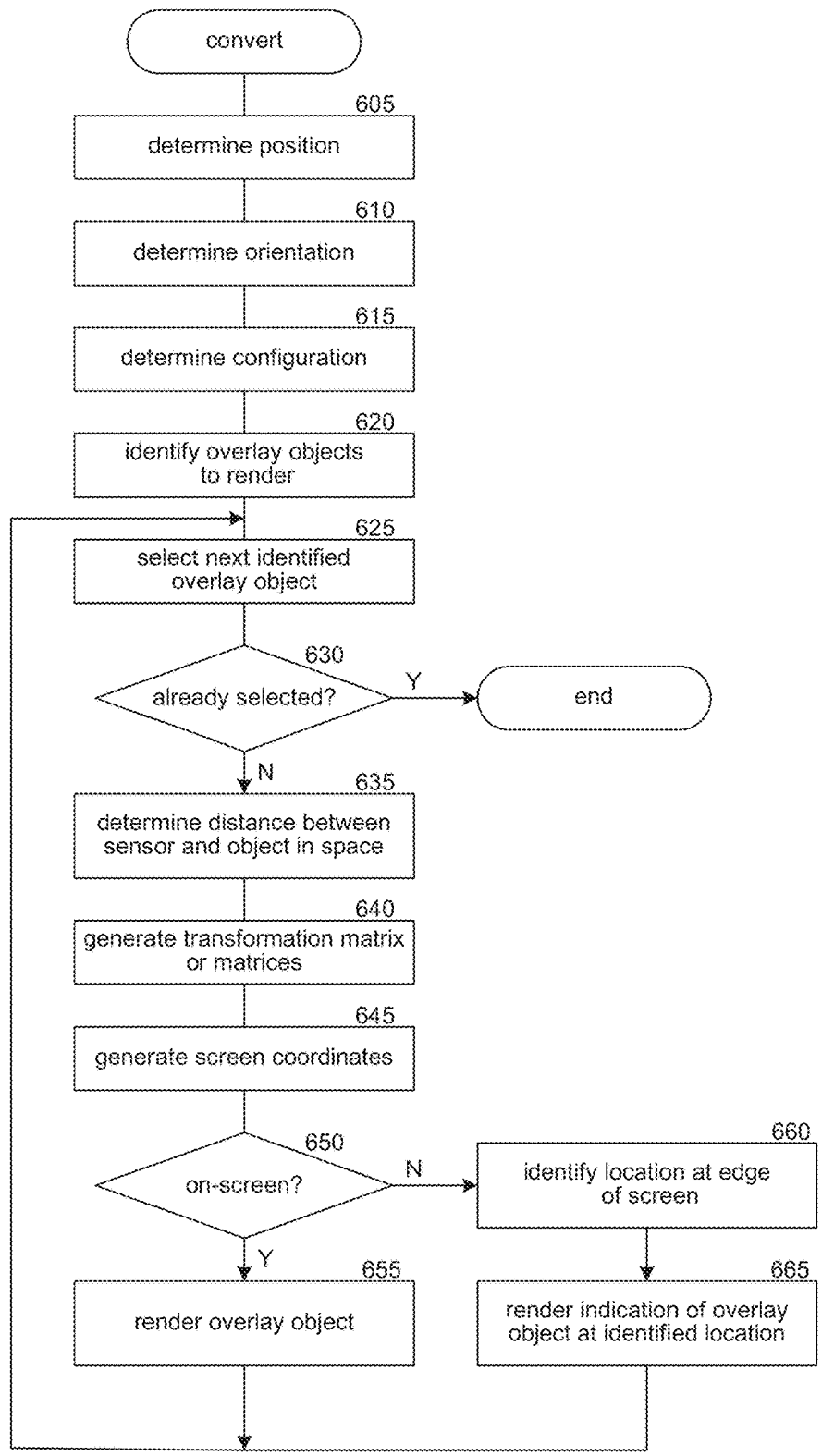
FIG. 6A is a flow diagram illustrating processing of a convert component in accordance with an embodiment of the present technology.

FIG. 6A is a flow diagram illustrating a processing method performed by a convert component in accordance with certain embodiments. The convert component is invoked to convert the position of overlay objects into screen coordinates for an overlay and a video frame based on metadata that has been aligned to the video frame. In block 605, the component determines position information for the video frame corresponding to, for example, the position of the image capturing device at or near the time at which the video frame was captured, based on the aligned metadata. In block 610, the component determines orientation information for the video frame corresponding to, for example, the orientation of the image capturing device at or near the time at which the video frame was captured, based on the aligned metadata. In block 615, the component determines configuration information for the video frame corresponding to, for example, the configuration of the image capturing device at or near the time at which the video frame was captured, based on the aligned metadata. In block 620, the component identifies overlay objects to render for the video frame. This determination may be based on selections from a user, objects that are visible within the captured image data, and/or on other suitable sources. For example, a user may click on an a representation of an overlay object, such as an entry in a list of overlay objects or the physical representation of the overlay object in displayed image data, to toggle a "render" flag for that overlay object. If the render flag is toggled "on" for an overlay object, the component will identify the overlay object as an overlay object to be rendered. If the render flag is toggled "off" for an overlay object, the component will not identify the overlay object as an overlay object to be rendered. In block 625, the component selects the next identified overlay object. In decision block 630, if the selected identified object has already been selected, then processing of the component completes, else the component continues at block 635. In block 635, the component determines the distance between the image capturing device and the physical location of the object corresponding to the selected overlay object. For example, if the overlay object corresponds to a building, the component will calculate the distance between the image capturing device at the time the video frame was captured and the building using a rangefinder and/or based on position information stored in the corresponding overlay file for the building and the determined position information for the image capturing device. In block 640, the component generates one or more transformation matrices based on the determined distance, position, orientation, and configuration information. For example, the component may generate a "world transformation" matrix that converts coordinates from a model-space (e.g., vertices defined relative to a model's origin) to world-space (e.g., vertices defined relative to a common origin), a "view transformation" matrix that converts coordinates from a world-space into camera-space (e.g., vertices defined relative to the location of a camera or virtual camera), and projection matrix that transforms coordinates from camera-space to screen-space based on a simulation of a camera lens. In some embodiments, the matrices are generated using DIRECTX™ classes/structures and accompanying methods, such as the DIRECTX™ Matrix structure and its LookAtLH, PerspectiveFovLH, and/or other methods. One skilled in the art will recognize that structures/classes and methods of other Application Programming Interfaces, such as OpenGL, may be employed. In block 645, the component applies the one or more transformation matrices to the overlay object to generate screen coordinates. The generated screen coordinates may correspond to a position that is not on the screen, for example, if the object is located outside of the area captured within the video frame. In decision block 650, if the generated screen coordinates are within the viewable area of the video frame, then the component continues at block 655, else processing continues at block 660. In block 655, the component renders the overlay object at the generated screen coordinates and then loops back to block 625 to select the next identified overlay object. In block 660, the component identifies a location at the edge of the screen. For example, if the generated screen coordinates are to the left of the screen the component may identify a location at the left edge of the screen. As another example, the component may identify the location on the edge of the screen that intersects an imaginary line drawn from the center of the screen to the generate screen coordinates. In block 665, the component renders an indication of the overlay object, such as an arrowhead or caret (or other shape), at the identified location and then loops back to block 625 to select the next identified overlay object.

Figure 6B:
FIG. 6B is a screenshot of a captured video frame that has not been augmented.

FIG. 6B is a screenshot 670 of a captured video frame that has not been augmented. The screenshot shows several structures and vehicles that a user or operator of the facility may wish to identify or highlight.

Figure 6C:
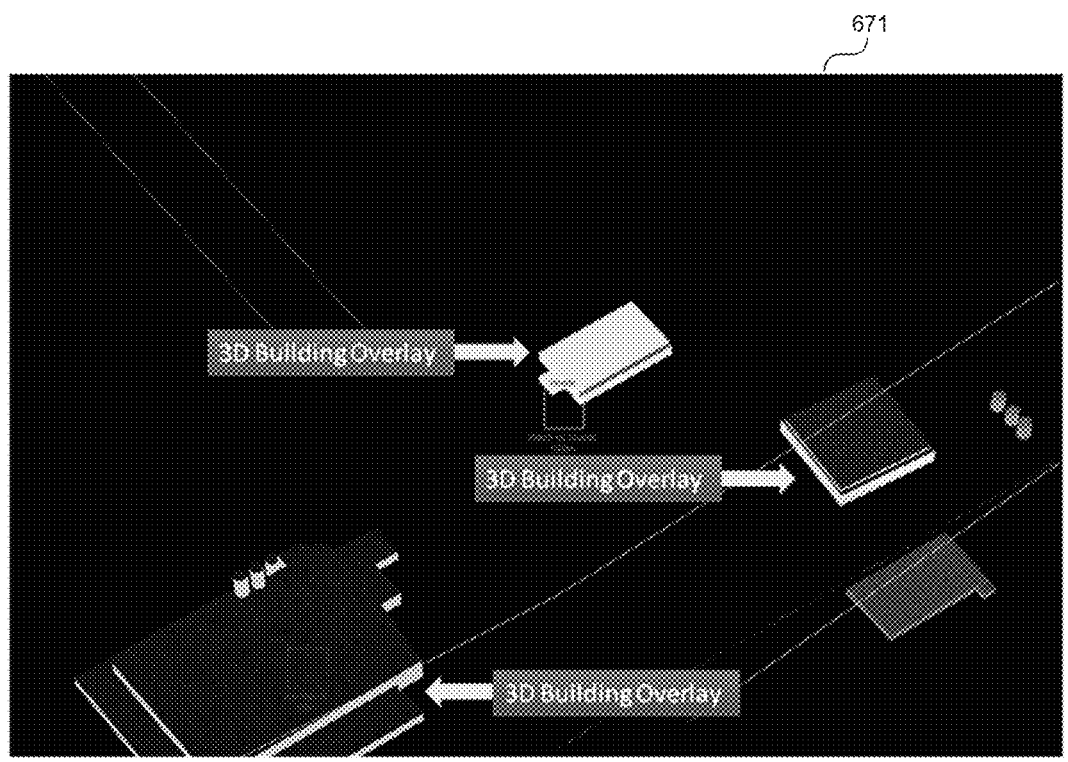
FIG. 6C is a screenshot of 3D Building overlay information in accordance with an embodiment of the present technology.

FIG. 6C is a screenshot 671 of 3D building overlay information in accordance with certain embodiments. The screenshot includes graphical information for three buildings in the screenshot.

Figure 6D:
FIG. 6D is a screenshot illustrating a captured video frame combined with 3D Building overlay information in accordance with an embodiment of the present technology.

FIG. 6D is a screenshot 672 illustrating a captured video frame combined with 3D building overlay information in accordance with certain embodiments. In this example, the 3D building information displayed in screenshot 671 is displayed over a captured video frame similar to the captured video frame of screenshot 670 (FIG. 6B).

Figure 6E:
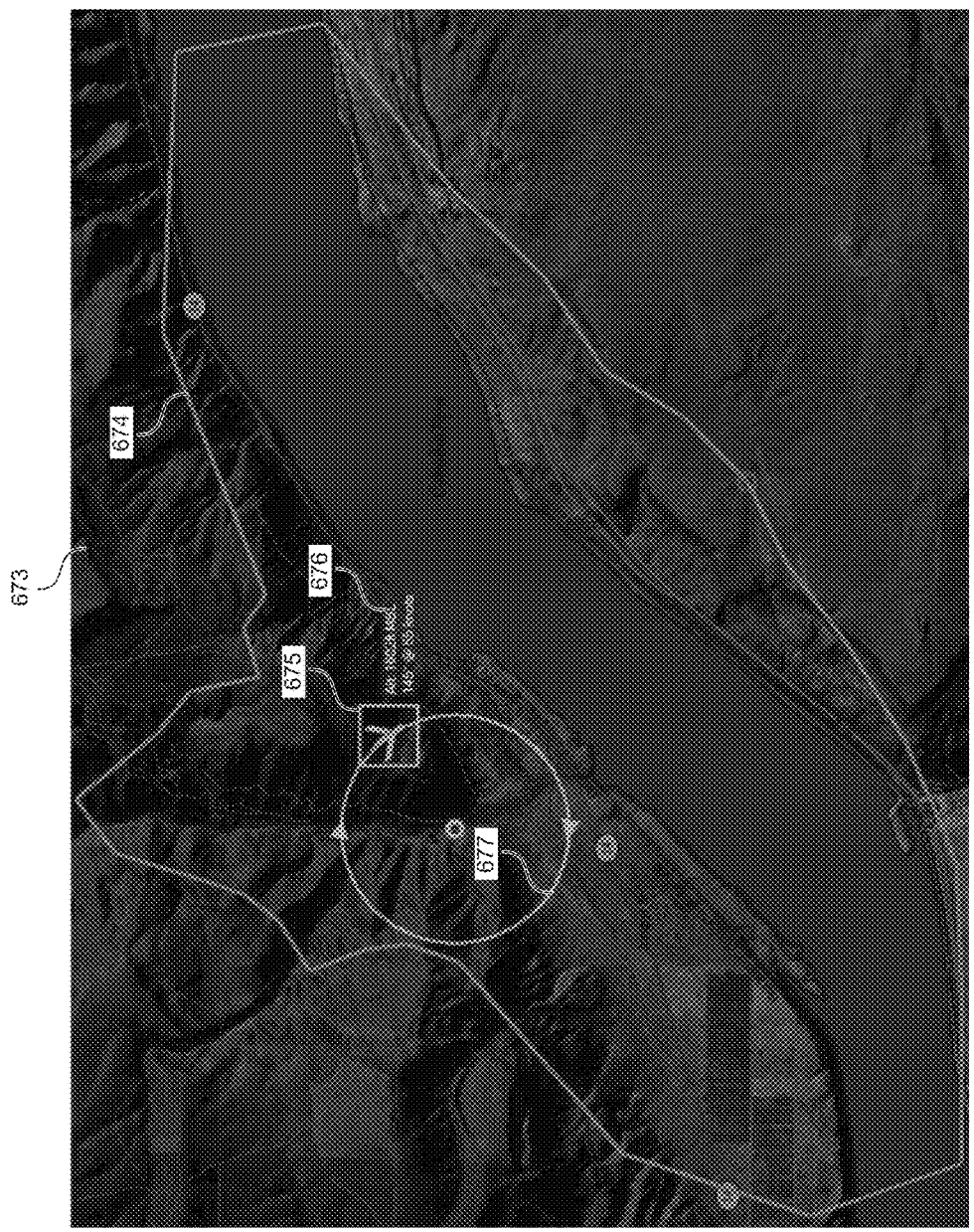
FIG. 6E is a screenshot illustrating a captured video frame combined with engine out overlay information and flight path overlay information in accordance with an embodiment of the present technology.

FIG. 6E is a screenshot 673 illustrating a captured video frame combined with engine out overlay information and flight path overlay information in accordance with certain embodiments. An engine out overlay provides an indication of the boundaries of an aircraft's (e.g., unmanned aircraft vehicle) range if the engine of the aircraft were to go out (e.g., if the engine were to fail or if the aircraft were to run out of fuel). The engine out boundary for the aircraft may be based on several parameters, including the aircraft's current position (e.g., latitude, longitude, and altitude), current orientation (e.g., heading and pitch (degree of inclination)), environmental conditions (e.g., wind, thermals, ridge lift, and lee waves), flight/gliding characteristics of the aircraft, surrounding terrain (e.g., elevation), and other parameters. For example, an aircraft may be able to glide without power a further distance while gliding with the wind than while gliding against the wind. As another example, an aircraft may be able to glide a further distance without power while gliding from a higher altitude than while gliding from a lower altitude or gliding towards an area with a lower altitude than while gliding towards an area with a higher altitude. Similarly, an aircraft may be able to glide a further distance in the direction that the aircraft is already traveling than in another direction (e.g., if the aircraft must turn around). In this example, an engine out boundary 674 for an aircraft 675 is represented along with the current flight path 677 for the aircraft 675 from a flight path overlay which has been combined with the engine out overlay. Information box 676 representing the current heading, speed, and altitude of the aircraft 675 is also displayed.

Figure 6F:
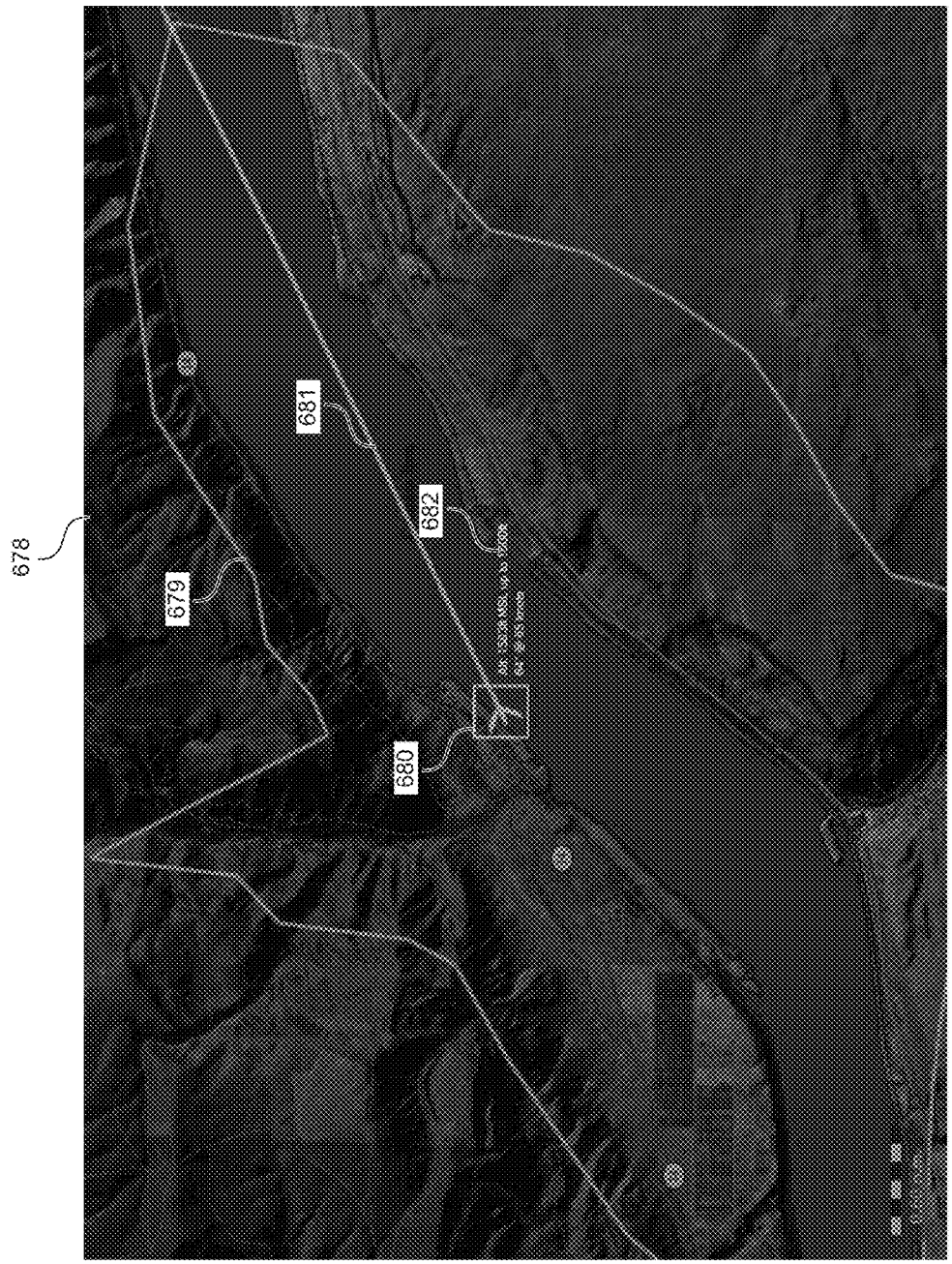
FIG. 6F is a screenshot illustrating a captured video frame combined with engine out overlay information in accordance with an embodiment of the present technology.

FIG. 6F is a screenshot 678 illustrating a captured video frame combined with engine out overlay information in accordance with certain embodiments. In this example, an engine out boundary 679 for an aircraft 680 is represented along with the current flight path 681 for the aircraft 680 and an information box 682 representing the current heading, speed, and altitude of the aircraft 680 is also displayed.

Figure 7A:
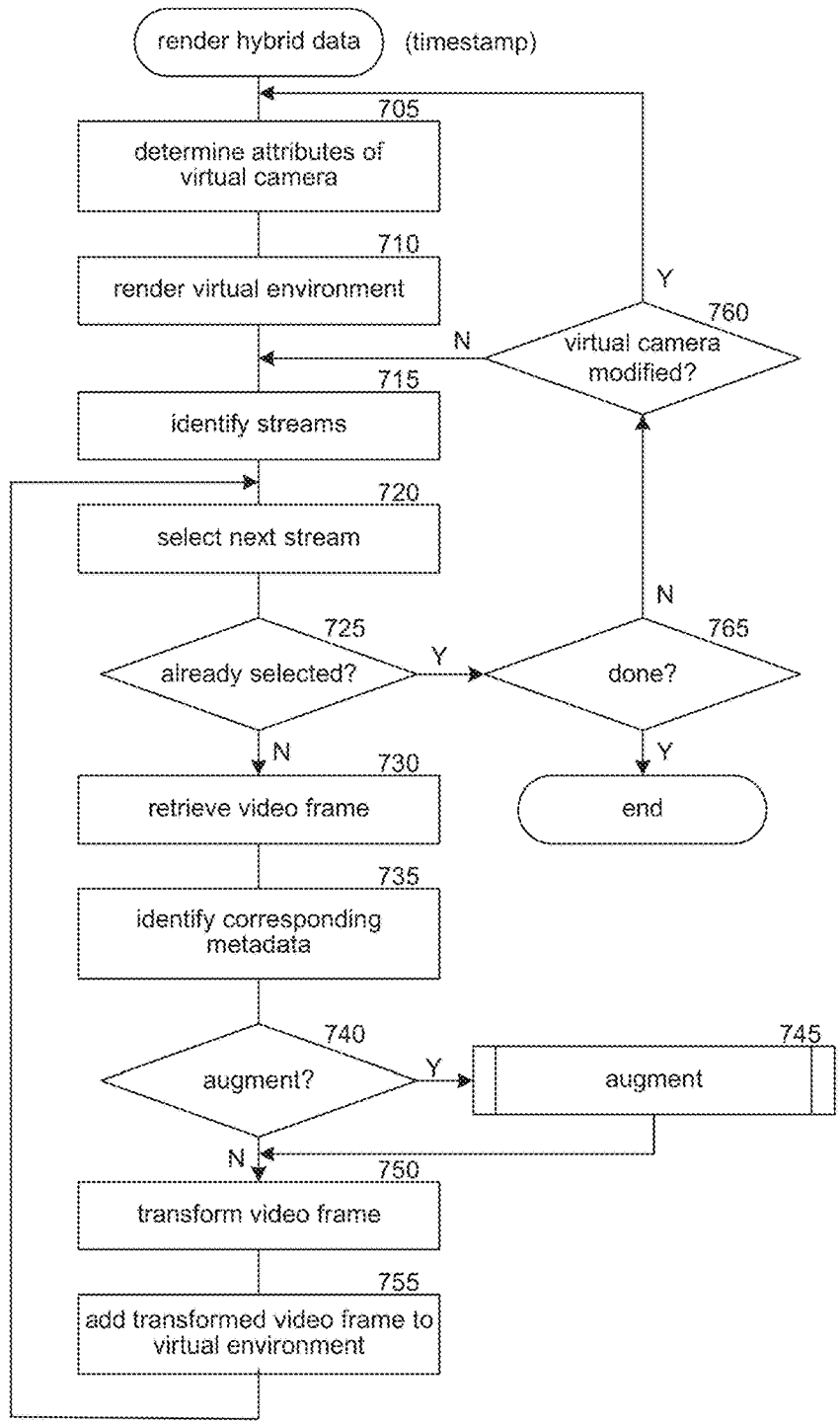
FIG. 7A is a block diagram illustrating the processing of a render hybrid component in accordance with an embodiment of the present technology.

FIG. 7A is a block diagram illustrating the processing method performed by a render hybrid component in accordance with certain embodiments. The render hybrid component renders a hybrid view of a scene that combines real-time captured image data streams with other image data, such as previously-captured image data, and/or rendered models of an area, to provide context and enhance situational awareness for the real-time image data. In block 705, the component determines a position, orientation, and configuration of a virtual camera. In block 710, the facility uses this information to render a virtual environment comprised of stored information to which the facility adds captured image data. For example, the facility may generate a virtual environment comprised of satellite images, wire models, map data, stored terrain information, and/or other suitable data based on the determined position, orientation, and configuration of a virtual camera. One skilled in art will recognize that virtual environments can be generated and rendered using any of a number of suitable types of data sources and information. In block 715, the component identifies image streams. The identified image streams may include, for example, real-time or stored image data streams captured by image capturing devices carried by unmanned aircraft vehicles, other vessels, and for other suitable platforms. In block 720, the component selects the next stream. In decision block 725, if the selected stream has already been selected then the component continues at decision block 760, else the component continues at block 730. In block 730, the component retrieves a video frame for the stream corresponding to the received timestamp. In block 735, the component identifies metadata corresponding to the selected video frame, such as position, orientation, and configuration information, based on the received timestamp. In decision block 740, if the retrieved video frame is to be augmented with overlay information, then the component continues at block 745, else processing continues at block 750. In block 740, the component invokes an augment component to enhance the retrieved video frame with overlay information. In block 750, the component generates one or more transformation matrices to transform the retrieved video frame based on metadata associated with the retrieved video frame and the virtual camera. In block 755, the component renders the transformed video frame with the rendered virtual environment by, for example, displaying the transformed video frame over the virtual environment or blending the transformed video frame with the virtual environment using alpha compositing techniques. In decision block 760, if rendering the hybrid environment is complete, then processing completes, else processing continues at decision block 765. In decision block 765, if the virtual camera has been modified, then the component continues at block 715 to identify streams for rendering, else processing continues at block 705 to determine a position, orientation, and configuration of a virtual camera. For example, a user may modify the virtual camera by moving the virtual camera to a new position (e.g., moving the virtual camera to a new point in space), changing the orientation of the camera (e.g., pointing the virtual camera in a different direction), or changing a configuration of the virtual camera (e.g., zooming in or zooming out).

Figure 7B:
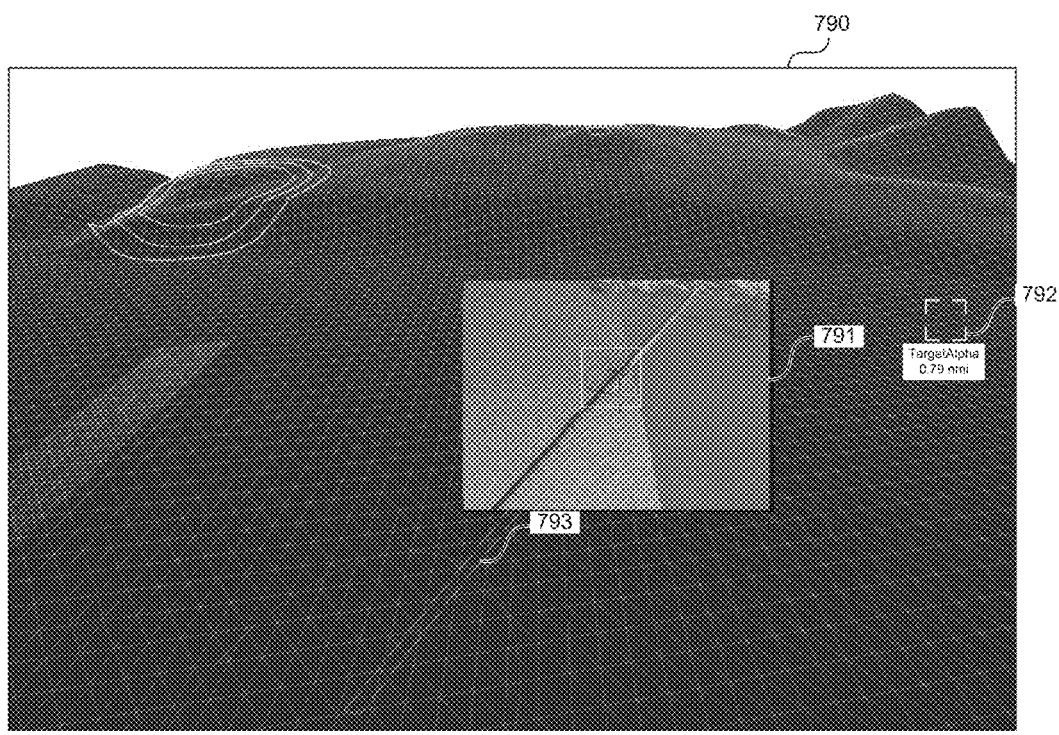
FIG. 7B is a screenshot illustrating a hybrid environment in accordance with an embodiment of the present technology.

FIG. 7B is a screenshot 790 illustrating a hybrid environment in accordance with certain embodiments. In this example, the hybrid environment includes captured video frame 791 of an image stream surrounded by a wire frame model simulating the terrain around the area within the captured video frame 791. In this example, the video frame 791 is captured from an unmanned aircraft vehicle. The hybrid environment in this example enhances situational awareness by providing additional context for the captured video frames. For example, a user or operator can see how the terrain changes around the area within the captured video frame and adjust the path of a vehicle to which the image capturing device is attached. Screenshot 790 also includes an object of interest overlay object 792 corresponding to "TargetAlpha," overlay object 793 corresponding to a bridge, and a detectability overlay object 794. Furthermore, the overlay information for overlay object 792 includes information indicating the distance between the overlay object 792 and the image capturing device, in this example 0.79 nautical miles. As additional video frames are received or as the virtual camera is modified, the facility can update the hybrid environment accordingly. Thus, a user or operator can view a real-time video stream in the context of surrounding information even when the facility does not have access to a real-time or near real-time stream of the surrounding information.

Figure 7C:
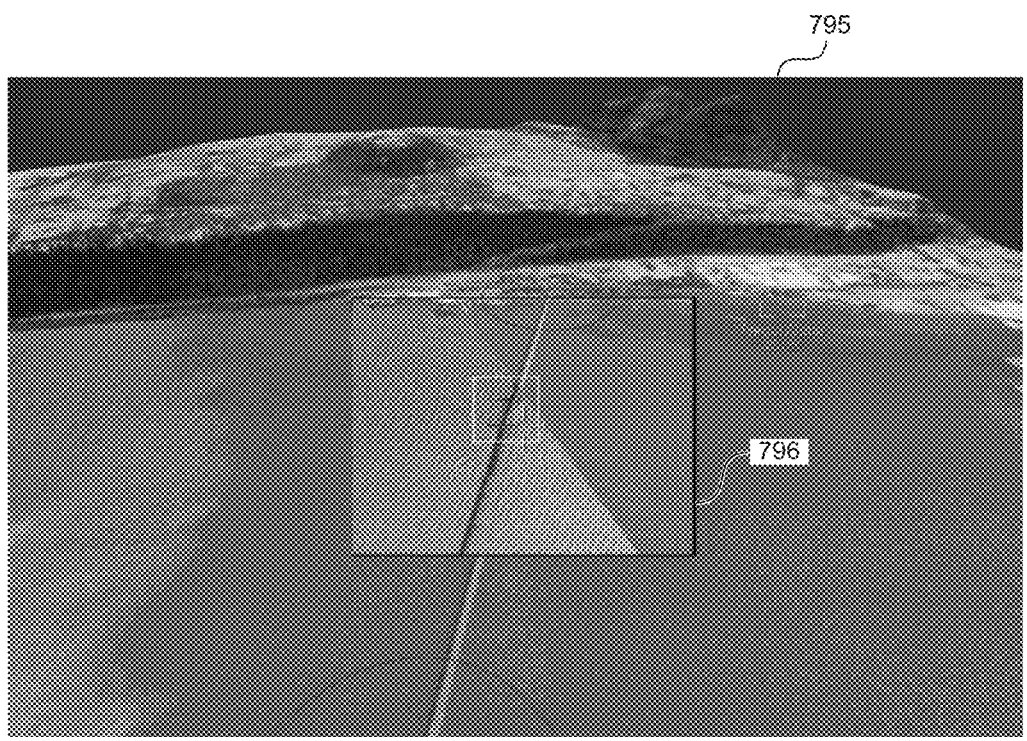
FIG. 7C is a screenshot illustrating a hybrid environment in accordance with an embodiment of the present technology.

FIG. 7C is a screenshot 795 illustrating a hybrid environment in accordance with certain embodiments. In this example, the hybrid environment includes captured video frame 796 of an image stream surrounded by a textured representation of the surrounding environment. The hybrid environment in this example enhances situational awareness by providing additional context for the captured video frames. For example, a user or operator can see how the terrain changes around the area within the captured video frames and can visualize buildings and roads outside of the view of the captured video frame. In this case, the textured representation can be obtained from a stored "stock" video of the region that is not as current as the captured video frame 796, but is more realistic than the wire-frame shown in FIG. 7C. In some instances, the user may prefer the realistic image of FIG. 7C, and in other instances, the user may prefer the simplicity of the wire-frame shown in FIG. 7B.

Figure 7D:
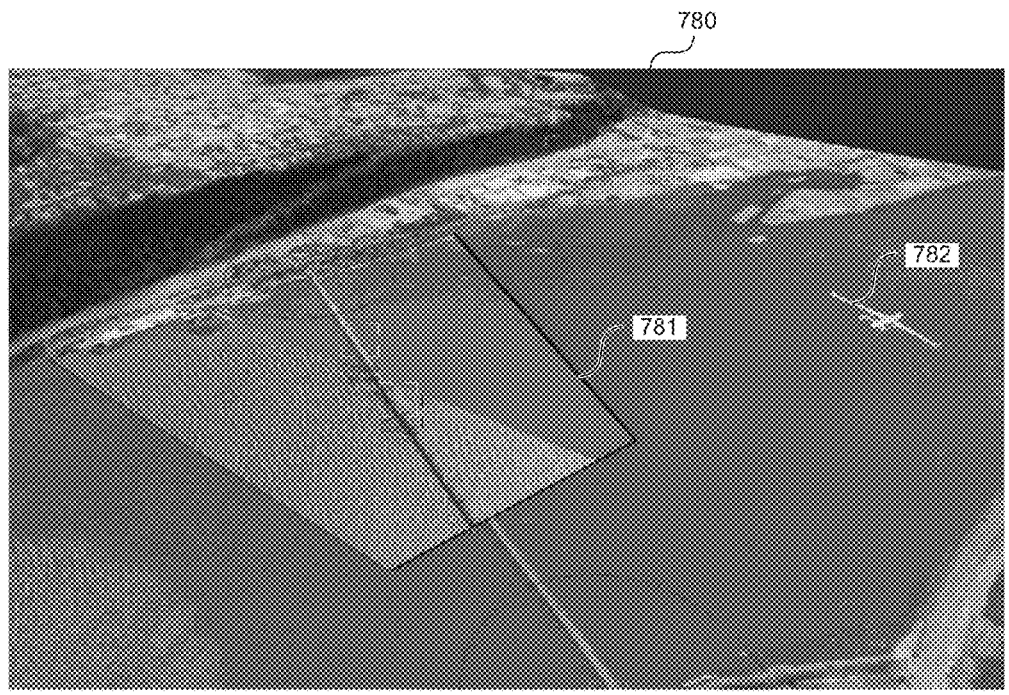
FIG. 7D is a screenshot illustrating a hybrid environment in accordance with an embodiment of the present technology.

FIG. 7D is a screenshot 780 illustrating a hybrid environment in accordance with certain embodiments. In this example, the hybrid environment is similar to the hybrid environment represented in FIG. 7C and includes a captured video frame 781 (e.g., a "live feed") of an image stream surrounded by a textured representation (e.g., a previously captured or non-live feed) of the surrounding environment but is rendered from a different perspective. In this case, the virtual camera has been displaced from the vehicle (represented by vehicle symbol 782) from which video frame 781 was captured. Thus, the virtual camera can be repositioned to any location to view the hybrid environment. One feature of this arrangement is that it allows the user to see the vehicle's position against a larger environmental view.

Figure 7E:
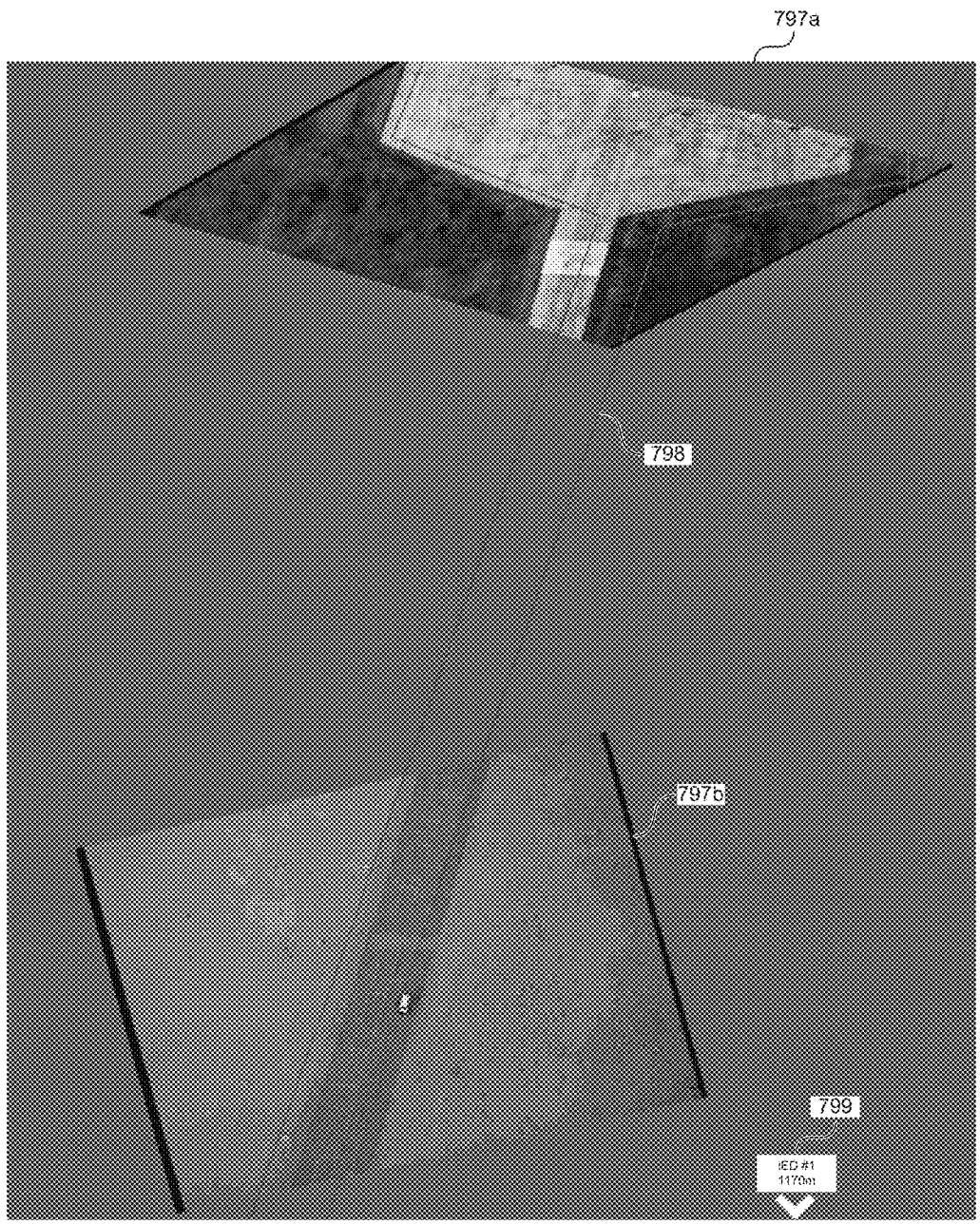
FIG. 7E is a screenshot illustrating a hybrid environment in accordance with an embodiment of the present technology.

FIG. 7E is a screenshot illustrating a hybrid environment in accordance with certain embodiments. In this example, the hybrid environment includes a first captured video frame 797a and a second captured video frame 797b, each video frame corresponding to a frame of a video stream captured by a different unmanned aircraft vehicle. The hybrid environment in this example enhances situational awareness by providing multiple real-time or near real-time views of areas within the hybrid environment. Accordingly, the user or operator is presented with multiple live feeds of a region as opposed to a single "soda straw" view of that region. The hybrid environment also includes road overlay object 798 corresponding to a road that spans the two areas captured within captured video frames 797a and 797b and object of interest overlay object 799 corresponding to an object of interest titled "IED #1," which is off the screen and not within the view of the virtual camera and, as indicated, is 1170 meters from the image capturing device.

Figure 8:
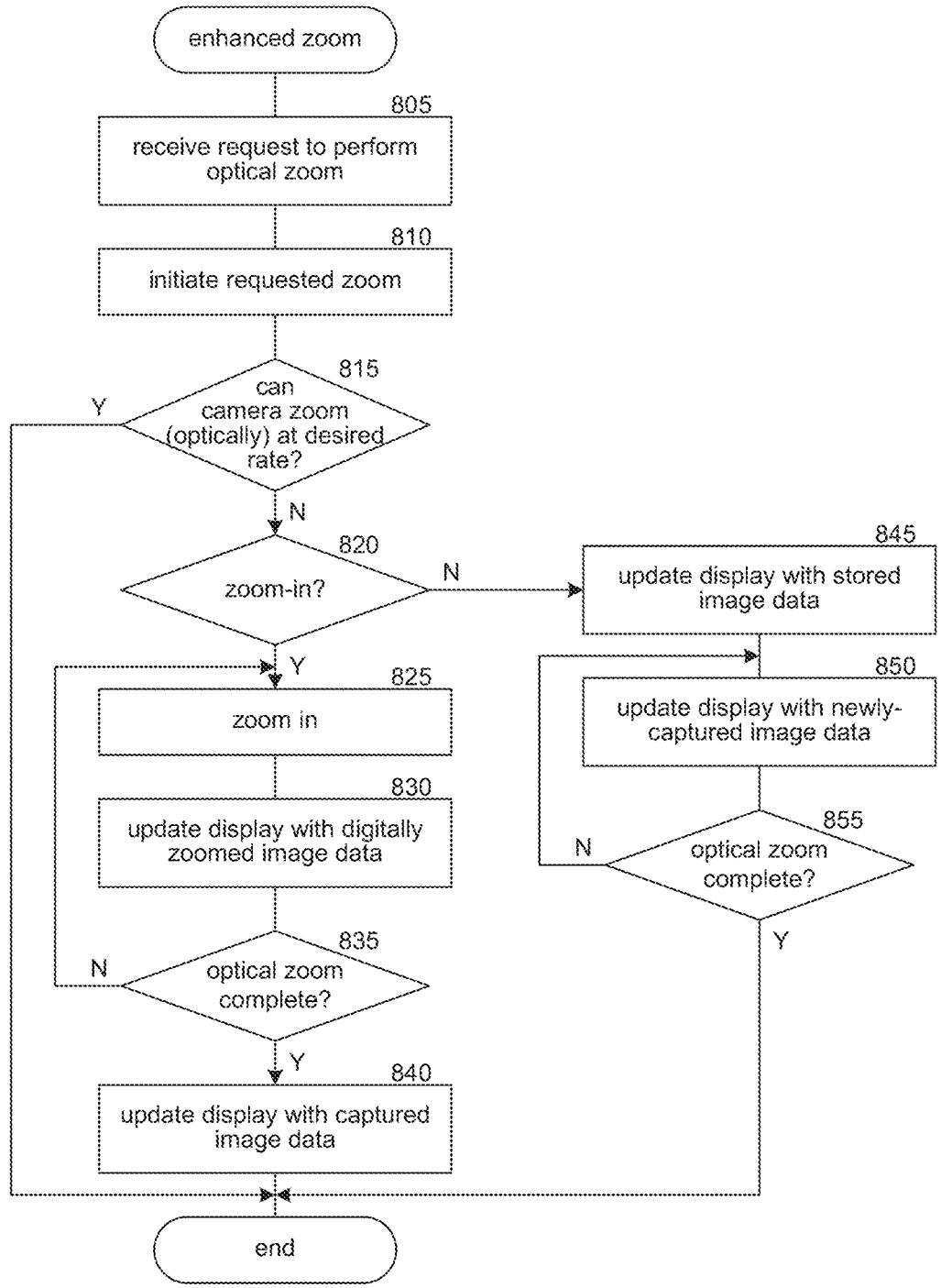
FIG. 8 is a flow diagram illustrating the processing of an enhanced zoom component in accordance with an embodiment of the present technology.

FIG. 8 is a flow diagram illustrating the processing method performed by an enhanced zoom component in accordance with certain embodiments. The component is invoked to zoom in on an area within a frame of a video stream captured by an image capturing device in real-time or near real-time. In block 805, the component receives a request to perform an optical zoom. The requested zoom operation may be a zoom-in operation or a zoom-out operation. The request may specify a zoom rate (e.g., millimeters (focal length) per second) and a relative zoom ratio (e.g., 0.01×, 0.1×, 2×, 10×, and so on). In block 810, the component initiates the requested zoom by, for example, forwarding the request to the image capturing device. In decision block 815, if the requested zoom cannot be performed at a specified rate (or a rate is not specified), then the component continues at decision block 820, else processing of the component completes. In decision block 820, if the requested zoom operation is a zoom-in operation, then the component continues at block 825, else processing continues at block 845. In block 825, the component digitally zooms in on the most recently-captured video frame based on the specified zoom ratio. In block 830, the component updates the display with the digitally-zoomed image data. In other words, the component crops and digitally-zooms the feed from the image capturing device to include only the area that the user or operator is interested in viewing, based on the requested zoom. Thus, although the quality or resolution of the displayed image data is temporarily reduced (due to the digital zooming), the user or operator is quickly presented with zoomed image data while the image capturing device adjusts to the requested focal length. In decision block 835, if the optical zoom is complete, then the component continues at block 840, else the component loops back to block 825 to perform a digital zoom on the most recently-captured video frame. Thus, the image data will slowly "crystallize" or "sharpen" as the resolution increases with each refresh of newly-acquired and optically-zoomed image data. In block 840, the component updates the display to include the captured video frames and then completes. In block 845, the component updates the display to include stored information about the area surrounding the video frame. The stored information, as discussed above, may include wire frame models based on topographic information, map information, satellite images, and so on. In essence, the component generates a hybrid environment while the camera is optically zooming out. In block 850, the component updates the display to include the newly-captured video frame (i.e., the captured image data at a wider angle). In decision block 855, if the optical zoom is complete, then processing of the component completes, else the component loops back to block 850 to update the display.

Figure 9A:
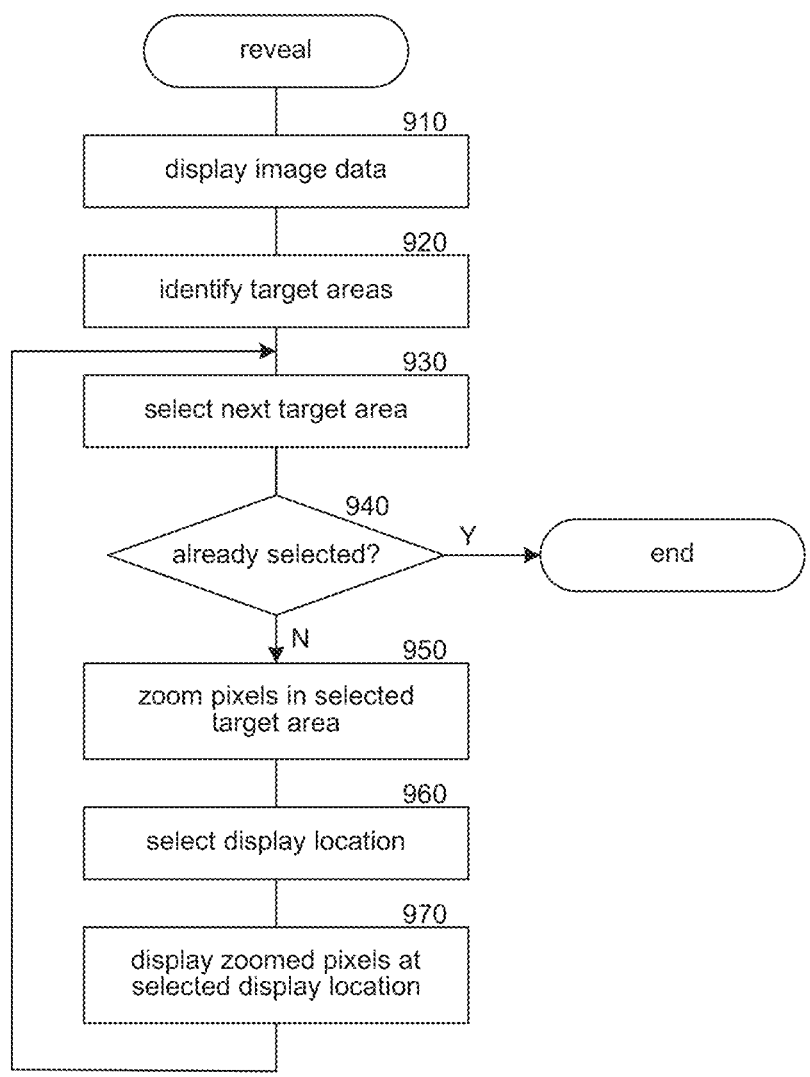
FIG. 9A is a flow diagram illustrating processing of a reveal component in accordance with an embodiment of the present technology.

FIG. 9A is a flow diagram illustrating a processing method performed by a reveal component in accordance with certain embodiments. The reveal component is invoked to highlight objects that a user or operator has expressed an interest in viewing by, for example, selecting the object from a list of objects, selecting the object from within displayed image data (e.g., highlighting the object by drawing a box around the object), and/or by other suitable techniques. For each of the objects that the user or operator has expressed an interest in viewing, the component displays, a zoomed in view of that object or an area associated with that object. In block 910, the component displays image data, such as video frames from a captured video stream. In block 920, the component identifies target areas corresponding to the objects of interest, such as a range or patch of pixels surrounding the object of interest. In block 930, the component selects the next target area. In decision block 940, if the selected target area has already been selected then processing of the component completes, else the component continues at block 950. In block 950, the component digitally zooms in on pixels in the selected target area. In block 960, the component selects a display location for the zoomed pixels. In block 970, the component displays the zoomed pixels at the selected display location and then loops back to block 930 to select the next target area.

Figure 9B:
FIG. 9B is a screenshot illustrating a display that includes "revealed" locations in accordance with an embodiment of the present technology.

FIG. 9B is a screenshot 990 illustrating a display that includes "revealed" locations generated by a reveal component in accordance with certain embodiments. In this example, screenshot 990 includes target areas 991, 992, and 993 and corresponding zoomed pixels 996, 995, and 994, respectively. For example, zoomed pixels 994 correspond to pixels within target area 993 (selected by a box drawn around the relevant pixels) and that have been zoomed digitally to highlight the corresponding target area.

Figure 10A:
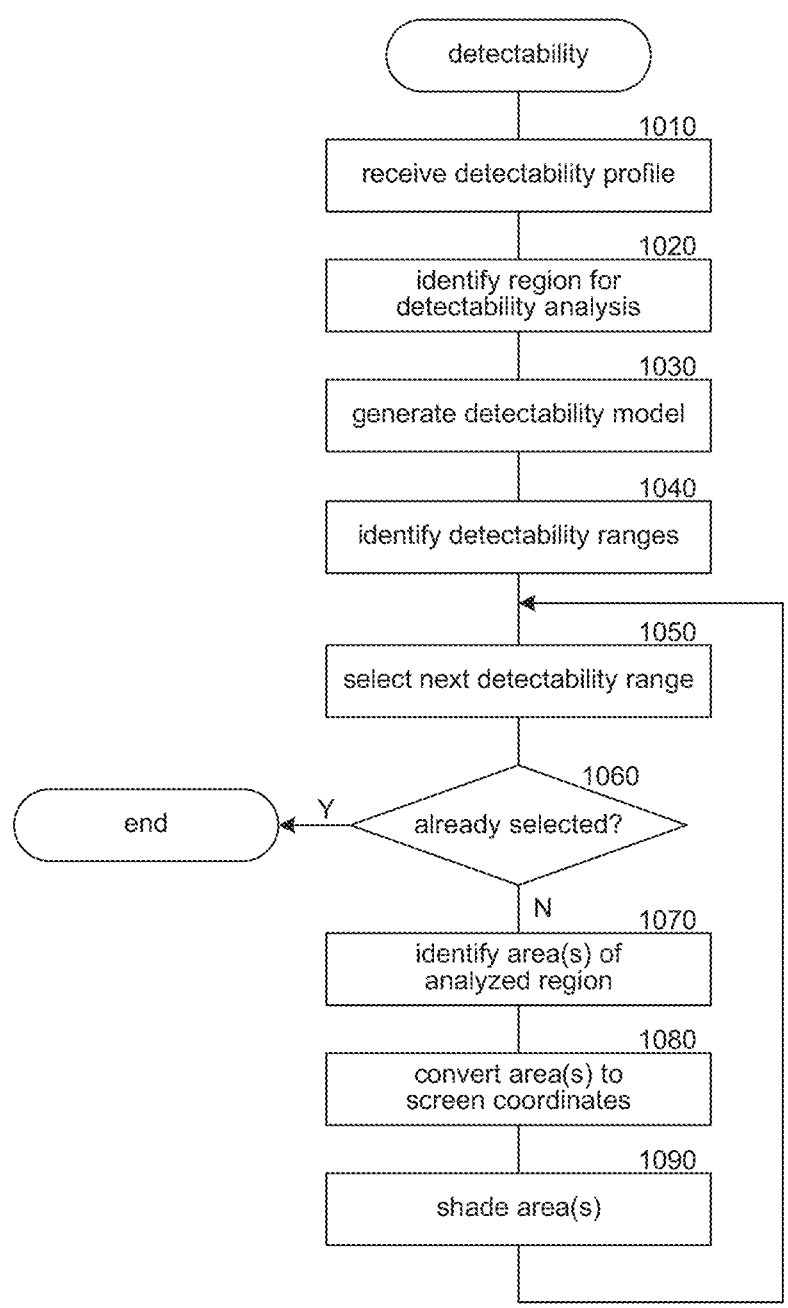
FIG. 10A is a flow diagram illustrating the processing of a detectability component in accordance with an embodiment of the present technology.

FIG. 10A is a flow diagram illustrating a processing method performed by a detectability component in accordance with certain embodiments. The facility invokes the detectability component to assess visual and/or acoustic detection levels of a vehicle, such as an unmanned aircraft vehicle, automobile, and so on by, for example, radar devices, people, or other detectors. In block 1005, the component receives a detectability profile for the vehicle specifying detectability parameters of the vehicle, such as engine noise information (e.g., decibels at different revolutions per minute (rpms)), size, color, reflectivity, etc. In block 1020, the component identifies a region for detectability analysis, such as a region currently visible within a display, a region specified by a user, a circular region around the vehicle and having a specified radius (e.g., 1 mile, 10 kilometers, 100 nautical miles), and so on. In block 1030, the component generates a detectability model for the vehicle and region based on, for example, the position of the vehicle, the detectability parameters of the vehicle, the current speed and engine rpms of the vehicle, the time of day, the terrain around the vehicle, slant angle to detectors, weather conditions (e.g., wind), and so on. The detectability model estimates the risk of detection at areas around the vehicle. In block 1040, the component identifies detectability ranges, each range corresponding to a range of likelihoods that the vehicle is detectable, such as {0%-30%, 30%-60%, and 60%-100%}, {10%-50% and 50-100%}, {70%-100%}, and so on. The detectability ranges may be specified by a user or generated by the facility based on the detectability model. For example, a user may specify an interest in highlighting areas having a 25%-75% likelihood of detectability and areas having a 75%-100% likelihood of detectability. In some cases, the detectability ranges may be based on the distance from the vehicle to various points in the surrounding terrain and distances may be assigned to each of a plurality of detection thresholds. For example, at distances greater than 5,000 feet, the vehicle may have a low probability of being detected, at distances less than 1,500 feet, the vehicle may have a high probability of being detected, and at distances between 1,500 and 5,000 feet, the vehicle may have a moderate probability of being detected. Accordingly, distances greater than 5,000 feet may be assigned to a high detection threshold, distances less than 1,500 feet may be assigned to a low detection threshold, and distances between 1,500 feet and 5,000 feet may be assigned to a moderate detection threshold. In block 1050, the component selects the next detectability range or threshold. In decision block 1060, if the selected detectability range or threshold has already been selected, then processing of the component completes, else the component continues at block 1070. In block 1070, the component identifies, based on the generated detectability model, the area or areas of the analyzed region where the detectability of the vehicle falls within the selected detectability range or threshold. In block 1080, the component converts the identified area(s) to generate screen coordinates using one or more transformation matrices. In block 1090, the component shades the area(s) based on the generated screen coordinates. For example, the component may shade the area corresponding to the lowest detectability range or highest threshold in green, shade the area corresponding to the highest detectability range or lowest threshold in red, and other areas in various shades of yellow and orange. One skilled in the art will recognize that the areas can be shaded using any color or other formatting, such as different shading patterns (e.g., cross hatch), and so on and that any number of detection ranges/thresholds may be used.

Figure 10B:
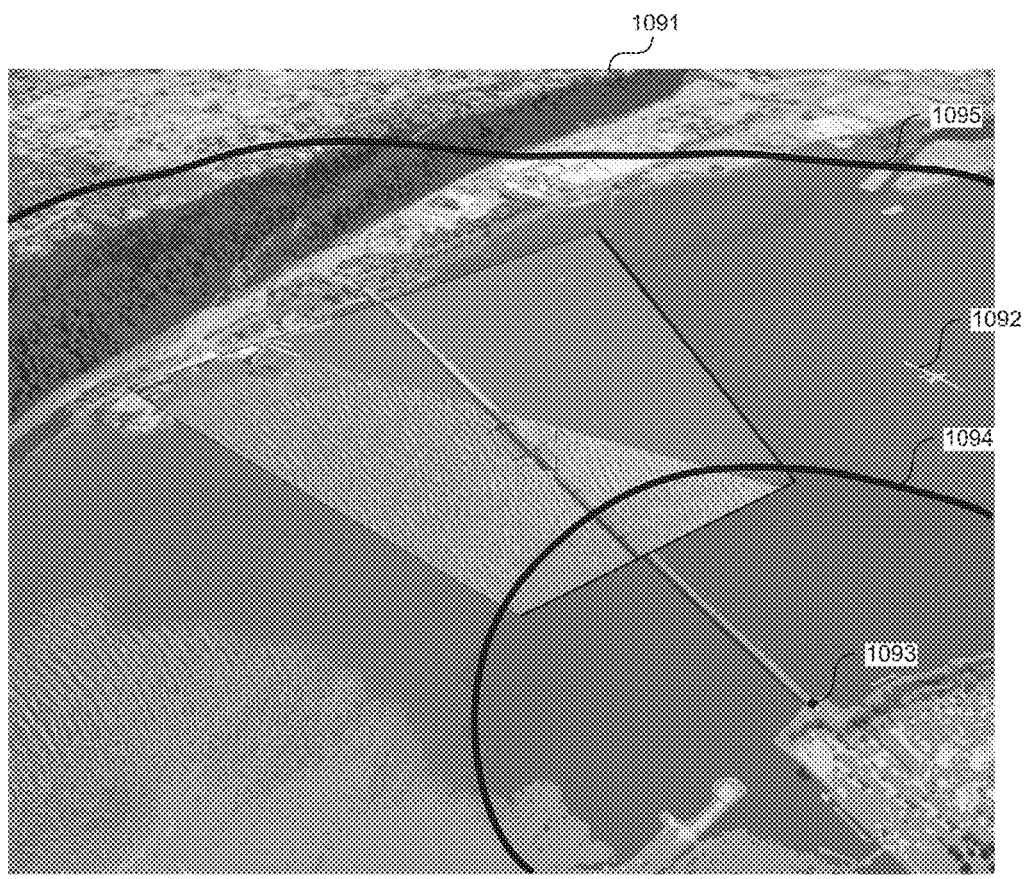
FIG. 10B is a screenshot illustrating detectability areas generated by a detectability component in accordance with an embodiment of the present technology.

FIG. 10B is a screenshot 1091 illustrating detectability areas generated by a detectability component in accordance with certain embodiments. In this example, the detectability of vehicle 1092, which is flying directly over point 1093, within three different areas is shown. Within the area surrounded by curve 1094, the vehicle 1092 has a high likelihood of detectability. In some examples, this area may be shaded in a particular color, such as red, to reflect the high likelihood of detectability. Within the area between curve 1094 and curve 1095, the vehicle 1092 has a moderate likelihood of detectability. In some examples, this area may be shaded in a particular color, such as yellow, to reflect the moderate likelihood of detectability. Outside the area surrounded by curve 1095, the vehicle 1092 has a low likelihood of detectability. In some examples, this area may be shaded in a particular color, such as green, to reflect the low likelihood of detectability.

Figure 11A:
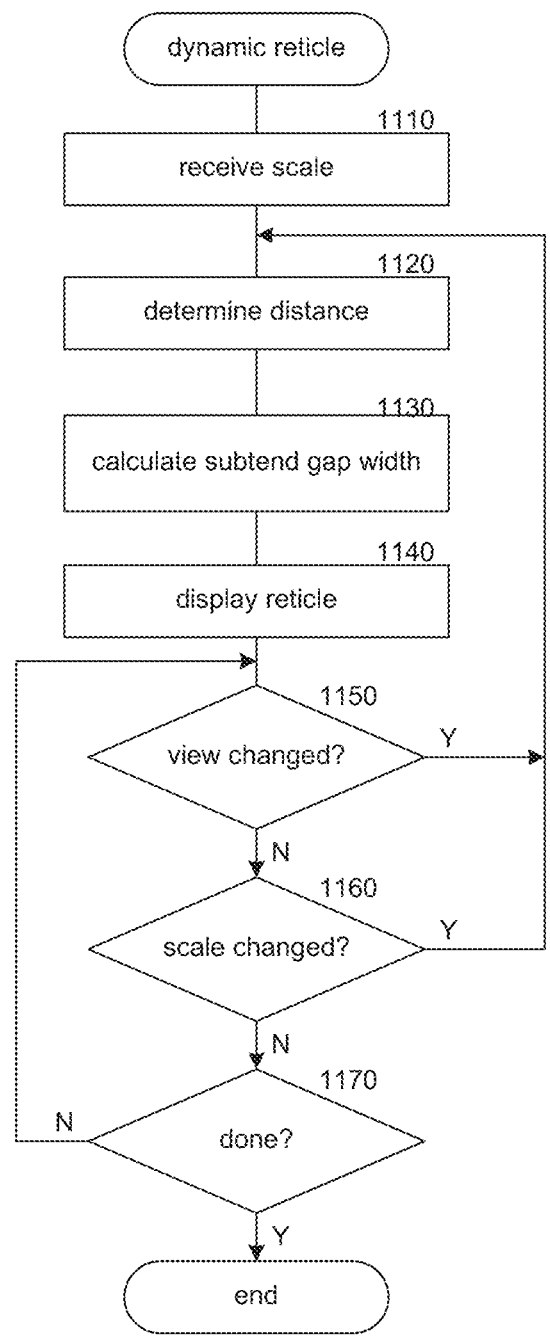
FIG. 11A is a block diagram illustrating the processing of a dynamic reticle component in accordance with an embodiment of the present technology.

FIG. 11A is a block diagram illustrating a processing method performed by a dynamic reticle component in accordance with certain embodiments. The component is invoked to render a reticle, for display over a video stream, that dynamically changes the width of the gap between reticle subtends or "ticks" as a user or operator zooms in or out (digitally or optically) so that the subtends represent the same (or roughly the same based on, for example, a predetermined threshold (e.g., +/−10%)) distance in the rendered images. In other words, the subtends of the dynamic reticle are automatically adjusted so that they represent a fixed scale as a user zooms in or out. For example, as a user zooms in, the distance between the subtends increases and as a user zooms out, the distance between the subtends decreases. In block 1110, the component receives a scale corresponding to a distance that each subtend gap is to represent, such as 1 foot, 10 feet, 100 meters, 1 mile, 5 kilometers, and so on. In block 1120, the component determines the distance to the captured scene based on, for example, the distance between the image capturing device (actual or virtual) and the point at the center of the screen, the distance between the image capturing device (actual or virtual) and an object in the video frame, and/or other suitable distance parameters. If the component has access to position information (e.g., longitude, latitude, and altitude) for one or more objects in the scene, and position information for the image capturing device, the component can calculate the distance directly. Alternatively, or in addition to the foregoing technique, the component may use a rangefinder to determine the distance. As another alternative/additional feature, the facility may prompt the user to provide the distance or an estimate for the distance. In block 1130, the component calculates the subtend gap width based on the determined distance and the received scale. In block 1140, the component displays the reticle with subtends spaced based on the determined subtend gap width. In decision block 1150, if the view has changed, such as when the user zooms in or out of the scene or if the image capturing device (actual or virtual) has moved, then the component loops back to block 1120 to determine the distance to the captured scene, else the component continues at decision block 1160. In decision block 1160, if the scale has changed, then the component loops back to block 1120 to determine the distance to the captured scene, else the component continues at decision block 1170. In decision block 1170, if display of the dynamic reticle is to continue, then the component loops back to block 1150 to determine if the view has changed, else processing of the component completes. In some embodiments, the facility may allow users or operators to further modify the reticle by, for example, rotating the reticle, modifying the shading or color of the reticle, and so on. Rotating the reticle allows a user or operator to align the reticle to different objects in the scene. Once aligned, the user or operator can better measure different objects in the scene using the subtended reticle. In some embodiments, the facility may further display the scale (i.e., the distance represented by each subtend gap) and/or an angle of rotation (e.g., 25 degrees clockwise).

Figure 11B:
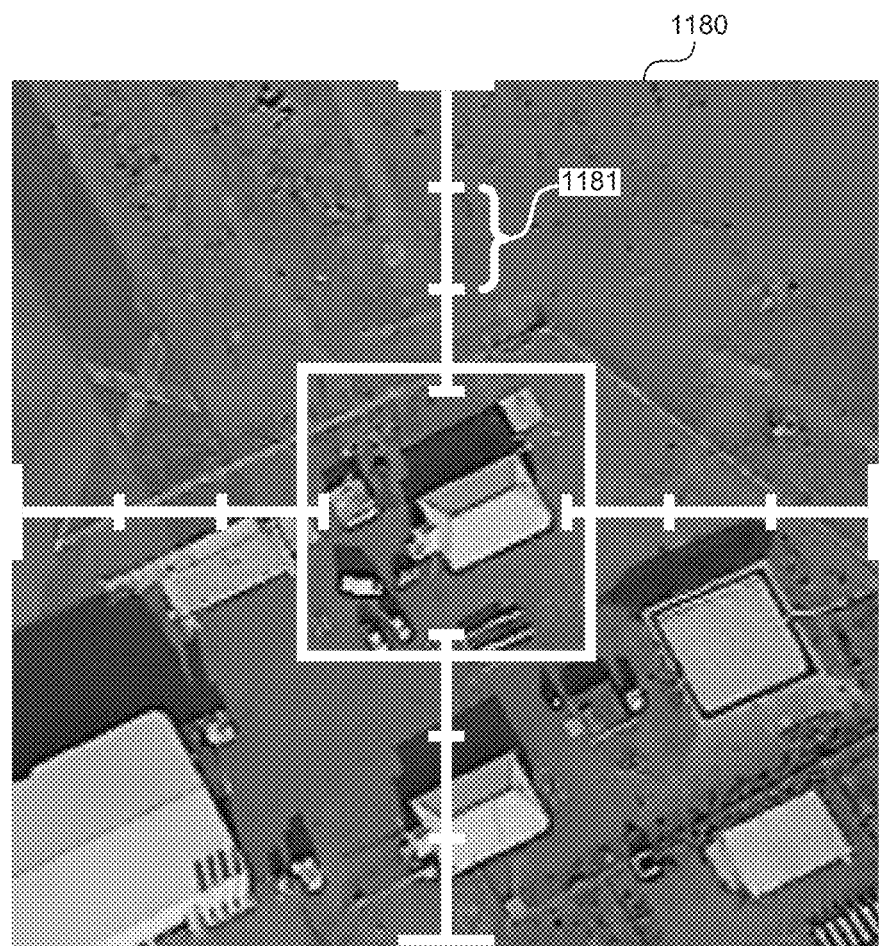
FIGS. 11B and 11C are screenshots illustrating a dynamic reticle displayed over a scene in accordance with an embodiment of the present technology.
Figure 11C:
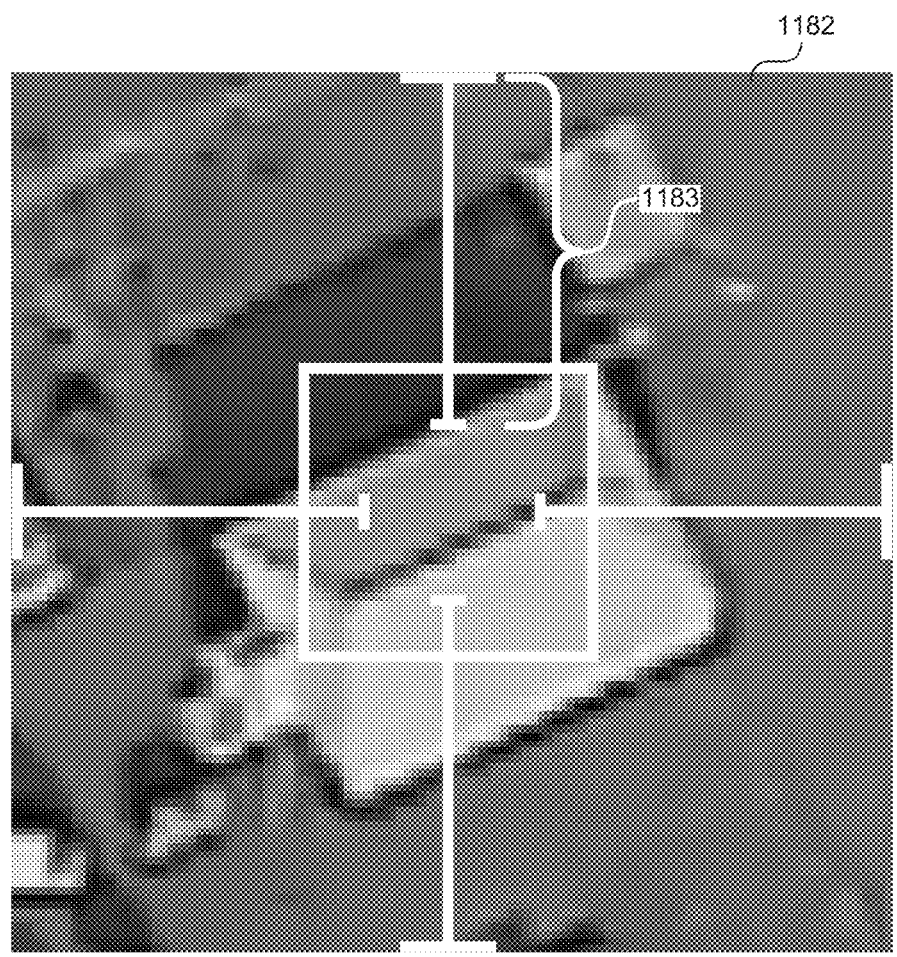

FIGS. 11B and 11C are screenshots 1180 and 1182 illustrating a dynamic reticle displayed over a scene in certain embodiments. In FIG. 11B, the scene is shown at a wide angle and the subtend gap width 1181 represents approximately one-eighth of the width of the video frame. FIG. 11C, by contrast, is a screenshot of the same scene after the scene has been zoomed in on. In FIG. 11C, the subtend gap width 1183 has increased to approximately two-fifths of the width of the video frame. However, in each of the screenshots 1180 and 1182, the respective subtend width represents approximately the same distance in the captured image data.

Figure 11D:
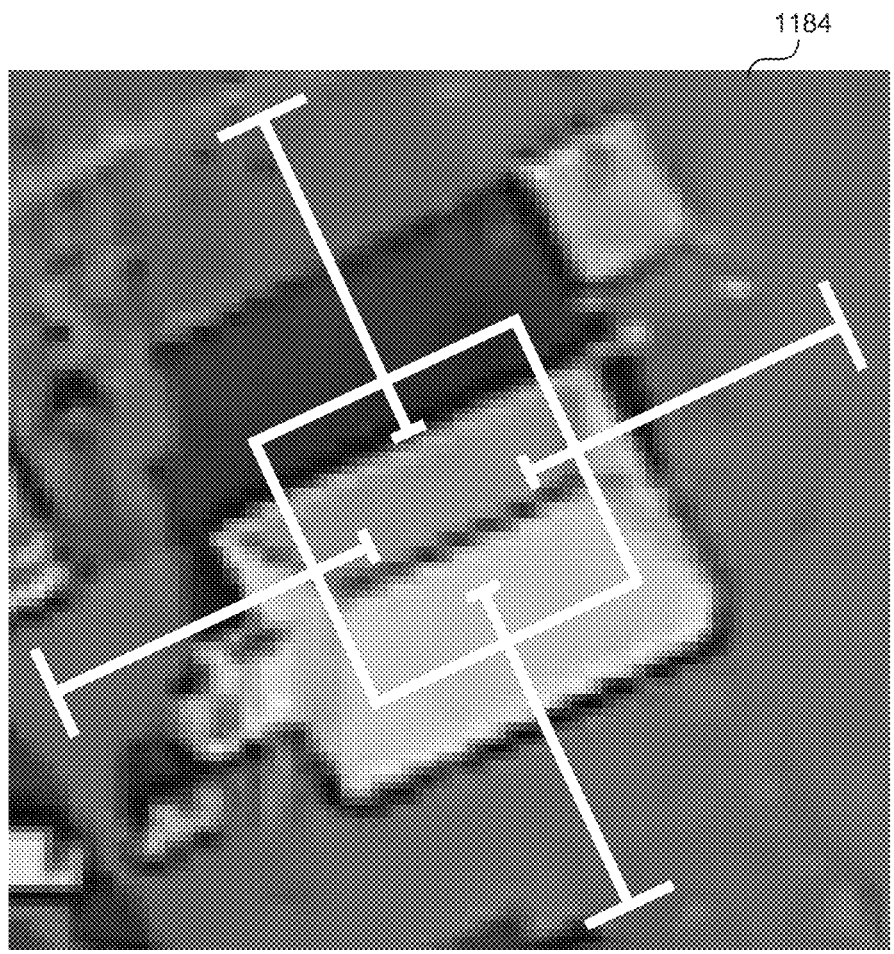
FIG. 11D is a screenshot illustrating a rotated dynamic reticle in accordance with an embodiment of the present technology.

FIG. 11D is a screenshot 1184 illustrating a rotated dynamic reticle in accordance with certain embodiments. In this example, the dynamic reticle has been rotated to align with the building in the center of the video frame so that the user can, for example, quickly compare the length or width of the building to the distance represented by each subtend gap width.

Figure 12A:
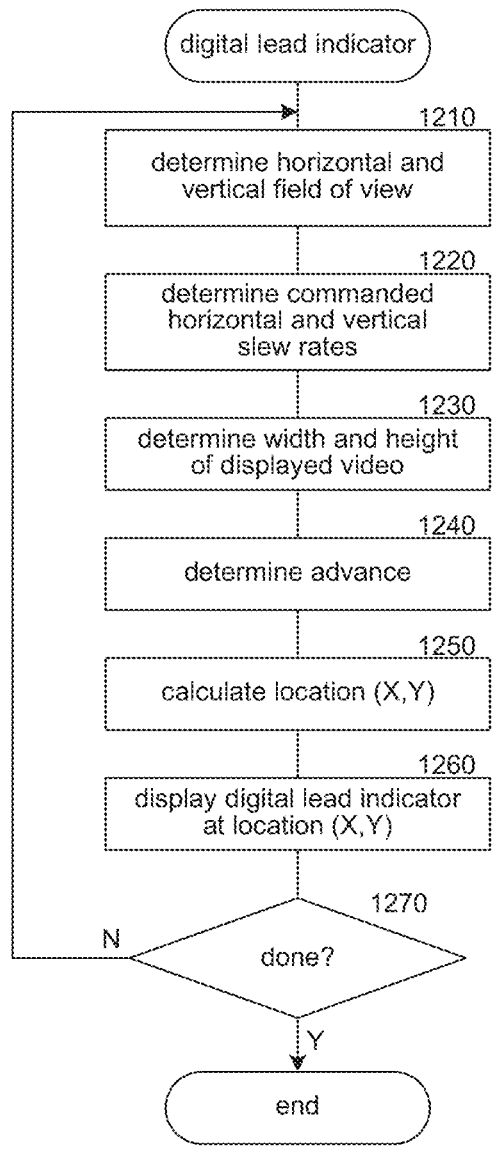
FIG. 12A is a flow diagram illustrating the processing of a digital lead indicator component in accordance with an embodiment of the present technology.

FIG. 12A is a flow diagram illustrating a processing method performed by a digital lead indicator component in accordance with certain embodiments. The component is invoked to display a digital lead indicator in association with displayed image data. In block 1210, the component determines a horizontal (e.g., left and right) and vertical (e.g., up and down) field of view of the image capturing device, in degrees or radians, based on the current configuration of the image capturing device, such as the current focal length and the size of the film or digital sensor (e.g., charge-coupled device). In block 1220, the component determines the commanded horizontal and vertical slew rates (e.g., the rotational rates of change in the horizontal and vertical directions in degrees per second or radians per second) based on, for example, the magnitude of the user input. The user input may correspond to input from an analog joystick that provides varying slew rates based on the extent to which the operator adjusts the joystick. In block 1230, the component determines the width and height of the displayed video in pixels. In block 1240, the component determines an advance (period of time), which may be specified by a user or set to a default value (e.g., 0.65 seconds, 1.0 seconds, 3.2 seconds). In block 1250, the component calculates coordinates (X, Y) for a location based on the determined fields of view, slew rates, screen width, screen height, and advance. In some embodiments, the location is determined in accordance with the following formulas:

$$X = \frac{hSlew * wVideo * advance}{fFov}$$

and $$Y = \frac{vSlew * hVideo * advance}{vFov}$$

where hSlew corresponds to the determined horizontal slew rate, wVideo corresponds to the determined displayed video width, hFov corresponds to the determined horizontal field of view, vSlew corresponds to the determined vertical slew rate, hVideo corresponds to the determined displayed video height, vFov corresponds to the determined vertical field of view, and advance corresponds to the determined advance value. The coordinates specify a location relative to a base reference point, or origin, such as the center of a video frame or the center of an area of interest while in tracking mode. In block 1260, the component displays the digital lead indicator (e.g., a dot, an "x," or another symbol) at the calculated coordinates (X, Y). As discussed above, the location at which the "digital lead indicator" is displayed correspond to a location where the image capturing device is predicted to be pointing (or "centered") in a specified period of time (e.g., 0.5 seconds, 1.0 seconds, 10 milliseconds). Thus, by placing the digital lead indicator on a specific location or target within captured image data, the user can control or command the image capturing device while reducing operator-induced oscillations. In decision block 1270, if the operator is no longer commanding the image capturing device to move, then processing of the component completes, else the component loops back to block 1210 to determine the horizontal and vertical fields of view.

Figure 12B:
FIG. 12B is a screenshot illustrating a captured video frame combined with a digital lead indicator in accordance with an embodiment of the present technology.

FIG. 12B is a screenshot 1280 illustrating a captured video frame combined with a digital lead indicator in accordance with certain embodiments. In this example, image data of a vehicle traveling along a road is displayed with a reticle 1281 and a digital lead indicator 1282. In this example, the digital lead indicator 1282 has been displaced from the reticle 1284 based on input from a user, such as manipulating a controller (e.g., joystick or other input device). The reticle 1281 represents the point at which the image capturing device capturing the image is currently pointing while the digital lead indicator 1282 represents the point at which the camera will be pointing in a previously specified advance period of time (e.g., 0.1 seconds, 5 seconds, 50 milliseconds). The position of the digital lead indicator may be calculated in accordance with the processing method illustrated in FIG. 12A.

Figure 12C:
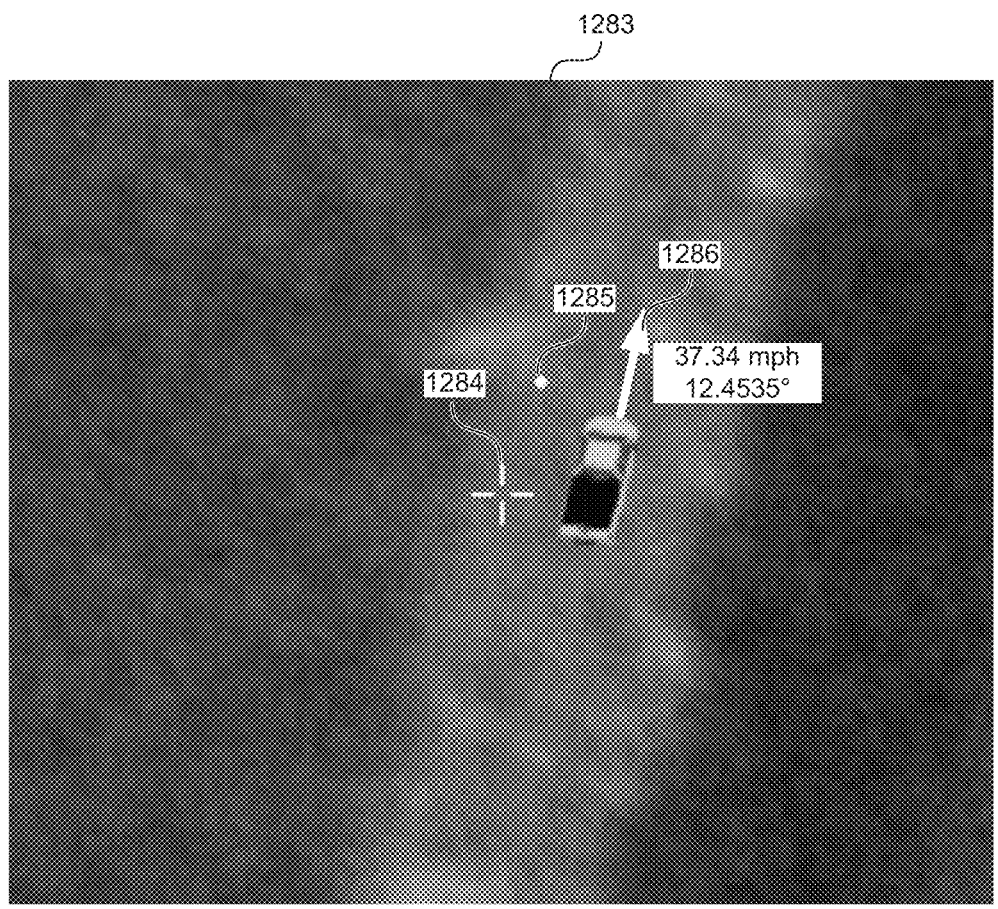
FIG. 12C is a screenshot illustrating a captured video frame combined with a digital lead indicator in accordance with an embodiment of the present technology.

FIG. 12C is a screenshot 1283 illustrating a captured video frame combined with a digital lead indicator in accordance with certain embodiments. In this example, image data of a vehicle traveling along a road is displayed with a reticle 1284 and a digital lead indicator 1285. In this example, the digital lead indicator 1285 has been displaced from the reticle 1284 based on input from a user. The reticle 1281 represents the point at which the image capturing device capturing the image is currently pointing while the digital lead indicator 1282 represents the point at which the camera will be pointing in a previously specified advance period of time (e.g., 0.1 seconds, 5 seconds, 50 milliseconds). The position of the digital lead indicator may be calculated in accordance with the processing method illustrated in FIG. 12A. Screenshot 1283 also includes heading and speed indicator 1286 indicating the vehicle is traveling at 37.34 miles per hour (mph) at a heading of 12.4535 degrees. The heading and speed of the vehicle can be determined by tracking the change of position of the vehicle between frames.

From the foregoing, it will be appreciated that specific embodiments of the technology have been described herein for purposes of illustration, but that various modifications may be made without deviating from the disclosed technology. For example, the facility can include additional components or features, and/or different combinations of the components or features described herein. For example, the digital lead indicator may be displayed simultaneously with the display of various overlays and overlay information, hybrid data, detectability information, and/or other suitable displayable information. Similarly, overlays and overlay information may be displayed simultaneously with a dynamic reticle, enhanced-zoomed data, revealed area, and/or other suitable displayable information. Moreover, various blocks within the Figures may be rearranged without changing the functionality of the disclosed techniques. Additionally, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method for enhancing image data captured by an image capturing device carried by an unmanned aerial vehicle system, the method comprising:
    receiving image data captured by the image capturing device carried by the unmanned aerial vehicle system, wherein at least one of a plurality of frames of the received image data has associated metadata comprising an orientation of the unmanned aerial vehicle system orientation of the image capturing device relative to the unmanned aerial vehicle system; and
    for at least one of a plurality of frames of the received image data,
        selecting a transformation matrix based on metadata associated with the frame, and
        for each of at least one overlay,
            applying the selected transformation matrix data to the overlay to transform the overlay.

2. The method of claim 1 wherein the topographical data includes at least one of wire frame data, map data, or terrain contour data.

3. The method of claim 1, further comprising:
    storing, for at least one of a plurality of geographic areas, bathymetric data for the at least one geographic area.

4. The method of claim 1, further comprising:
    in response to receiving a request to change the orientation of the image capturing device,
        determining a horizontal field of view for the image capturing device,
        determining a vertical field of view for the image capturing device,
        determining a horizontal slew rate for changing the orientation of the image capturing device,
        determining a vertical slew rate for changing the orientation of the image capturing device,
        determining a width of a displayed image,
        determining a height of a displayed image,
        determining an advance period,
        calculating a coordinate based on the determined horizontal field of view, the determined vertical field of view, the determined horizontal slew rate, the determined vertical slew rate, the determined width, the determined height, and the determined advance period, and
        providing for display an indication of a digital lead indicator at the calculated coordinate.

5. The method of claim 1, further comprising:
    in response to receiving a request to perform an optical zoom operation,
        digitally zooming a video frame captured by the image capturing device,
        providing for display at least a portion of the digitally-zoomed video frame in place of a displayed video frame,
        determining whether the image capturing device has completed the requested optical zoom operation, and
        in response to determining that the image capturing device has completed the requested optical zoom operation, replacing a digitally-zoomed video frame with a video frame captured by the image capturing device.

6. The method of claim 1 wherein the at least one overlay includes an object of interest overlay, a map annotation overlay, a heading and groundspeed overlay, a flight path overlay, and a waypoint and route overlay.

7. The method of claim 1 wherein the at least one overlay includes an engine out boundaries overlay, a terrain contour overlay, a map overlay, a building overlay, and a city block overlay.

8. The method of claim 1 wherein the at least one overlay includes a 3D airspace overlay, a detectability overlay, an automatic identification system (AIS) overlay, and an approach information overlay.

9. A computer-readable medium storing instructions that, when executed by a computing system having a processor, cause the computing system to perform a method comprising:
    identifying a first image stream captured by a first image capturing device and including images of a first area within a geographic region;
    identifying a second image stream other than the first image stream captured by a second image capturing device other than the first image capturing device and including images of a second area within the geographic region other than the first area within the geographic region;
    rendering a hybrid environment comprising at least one image from the first image stream and at least one image from the second image stream, wherein the rendering comprises:
        determining a position of a virtual camera relative to the hybrid environment,
        determining a position of the first image capturing device relative to the geographic region, and
        applying a first transformation matrix to images of the first stream to generate first transformed frames,
    wherein the computer-readable medium is not a transitory, propagating signal.

10. The computer-readable medium that is not a transitory, propagating signal, of claim 9 wherein the first image capturing device is carried by an aerial vehicle system and wherein the rendered hybrid environment includes a graphical representation of the aerial vehicle system at a location that approximates the actual location of the aerial vehicle system relative to the geographic region.

11. The computer-readable medium that is not a transitory, propagating signal, of claim 9, the operations further comprising:
    for each of a plurality of overlays,
        for each of a plurality of objects of the overlay,
            transforming a position of the object into screen coordinates, and
            providing an indication of the object for display at the screen coordinates.

12. The computer-readable medium that is not a transitory, propagating signal, of claim 11, the operations further comprising:

for at least one overlay,
for at least one object of the overlay,
receiving, from a user, a label for the object,
storing the received label, and
providing for display an indication of the received label.

13. A computing system comprising:
one or more processors;
at least one processor, of the one or more processors, configured to receive a request to perform an optical zoom-in operation of an image capturing device;
at least one processor, of the one or more processors, configured to, while the image capturing device is performing the requested optical zoom-in operation,
digitally zoom-in on a video frame captured by the image capturing device, provide for display at least a portion of the digitally-zoomed-in on video frame, and
determine whether the image capturing device has completed the optical zoom-in operation; and
at least one processor, of the one or more processors, configured to, replace a digitally-zoomed-in video frame with a video frame captured by the image capturing device.

14. The computing system of claim 13, further comprising:
means for augmenting image data captured by the image capturing device with overlay information; and
means for synchronizing image data captured by the image capturing device with associated metadata.

15. The computing system of claim 14, wherein the means for augmenting comprises means for converting a position of at least one overlay object into screen coordinates.

16. The computing system of claim 13, further comprising:
means for rendering a digital lead indicator.

17. The computing system of claim 13, further comprising:
means for rendering a dynamic reticle.

18. A non-transitory, computer-readable medium storing instructions that cause a computing system having a processor to perform operations comprising:
providing images captured by an image capturing device for display; and
in response to receiving a request to change the orientation of an image capturing device,
determining a horizontal slew rate for changing the orientation of the image capturing device,
determining a vertical slew rate for changing the orientation of the image capturing device,
determining a period of time, calculating a coordinate based on the determined horizontal slew rate, the determined vertical slew rate, and the determined period of time, and
displaying an indication of a digital lead indicator at the calculated coordinate.

19. The non-transitory, computer-readable medium of claim 18 wherein the horizontal and vertical slew rates are determined based on a magnitude of user input.

20. The non-transitory, computer-readable medium of claim 18 wherein the coordinate (X, Y) is calculated according to the following equations:

$$X = \frac{hSlew * wVideo * \text{advance}}{hFov},$$

and $$Y = \frac{vSlew * hVideo * \text{advance}}{vFov},$$

wherein hSlew corresponds to the determined horizontal slew rate, wVideo corresponds to a determined width for the provided images, hFov corresponds to a determined horizontal field of view, vSlew corresponds to the determined vertical slew rate, hVideo corresponds to a determined height for the displayed images, vFov corresponds to a determined vertical field of view, and advance corresponds to the determined period of time.

* * * * *

UNITED STATES PATENT AND TRADEMARK OFFICE
CERTIFICATE OF CORRECTION

PATENT NO. : 10,334,210 B2  
APPLICATION NO. : 15/162463  
DATED : June 25, 2019  
INVENTOR(S) : Davidson, Jr. et al.

Page 1 of 1

It is certified that error appears in the above-identified patent and that said Letters Patent is hereby corrected as shown below:

In the Claims

Column 19, Line 26, Claim 1:
After "vehicle system" add --and an--.

Signed and Sealed this
Fifth Day of November, 2019

Andrei Iancu
*Director of the United States Patent and Trademark Office*